United States Patent
Cuno et al.

(10) Patent No.: US 10,816,735 B2
(45) Date of Patent: Oct. 27, 2020

(54) LENSED CONNECTOR FERRULE ASSEMBLIES AND METHODS OF FABRICATING THE SAME

(71) Applicant: Corning Research & Development Corporation, Corning, NY (US)

(72) Inventors: Alexander Lee Cuno, Sayre, PA (US); Oberon Denaci Deichmann, Painted Post, NY (US); Davide Domenico Fortusini, Painted Post, NY (US); Wei Jiang, Ithaca, NY (US); William James Miller, Horseheads, NY (US); James Scott Sutherland, Corning, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/454,558

(22) Filed: Jun. 27, 2019

(65) Prior Publication Data

US 2020/0041731 A1 Feb. 6, 2020

Related U.S. Application Data

(60) Provisional application No. 62/712,734, filed on Jul. 31, 2018.

(51) Int. Cl.
*G02B 6/38* (2006.01)

(52) U.S. Cl.
CPC ......... *G02B 6/3843* (2013.01); *G02B 6/3853* (2013.01); *G02B 6/3861* (2013.01); *G02B 6/3874* (2013.01)

(58) Field of Classification Search
CPC .. G02B 6/3843; G02B 6/3874; G02B 6/3853; G02B 6/3861
See application file for complete search history.

(56) References Cited

U.S. PATENT DOCUMENTS

| 4,518,222 A | 5/1985 | Borrelli et al. |
| 6,026,202 A | 2/2000 | Chang |

(Continued)

FOREIGN PATENT DOCUMENTS

| JP | 2011191647 A | 9/2011 |
| JP | 2014026108 A | 2/2014 |

OTHER PUBLICATIONS

Borrelli et al; "Photolytic Technique for Producing Microlenses in Photosensitive Glass"; Applied Optics, vol. 24, No. 16; (1985); pp. 2520-2525.

(Continued)

*Primary Examiner* — Ryan A Lepisto
(74) *Attorney, Agent, or Firm* — Michael E. Carroll, Jr.

(57) ABSTRACT

Optical assemblies and lensed connector ferrule assemblies having one or more optical fibers aligned to one or more lenses of a lens substrate and methods of their manufacture are disclosed. In one embodiment, an optical assembly includes a ferrule and a mirror surface. The ferrule includes a lens holder having a lens substrate cavity and an engagement surface. The ferrule further includes a lens substrate disposed within the lens substrate cavity. The lens substrate has at least one lens. The mirror surface is coupled to the engagement surface such that the at least one lens is offset from the mirror surface by an offset distance.

44 Claims, 25 Drawing Sheets

(56) References Cited

U.S. PATENT DOCUMENTS

| | | |
|---|---|---|
| 6,853,488 B1 | 2/2005 | Cao |
| 7,400,799 B2 * | 7/2008 | Koishi .................... G02B 6/32 385/33 |
| 2004/0052476 A1 * | 3/2004 | Houmault ................ G02B 6/32 385/88 |

OTHER PUBLICATIONS

Joyce et al; "Alignment of Gaussian Beams"; Applied Optics, vol. 23. No. 23; (1984) pp. 4187-4196.

* cited by examiner

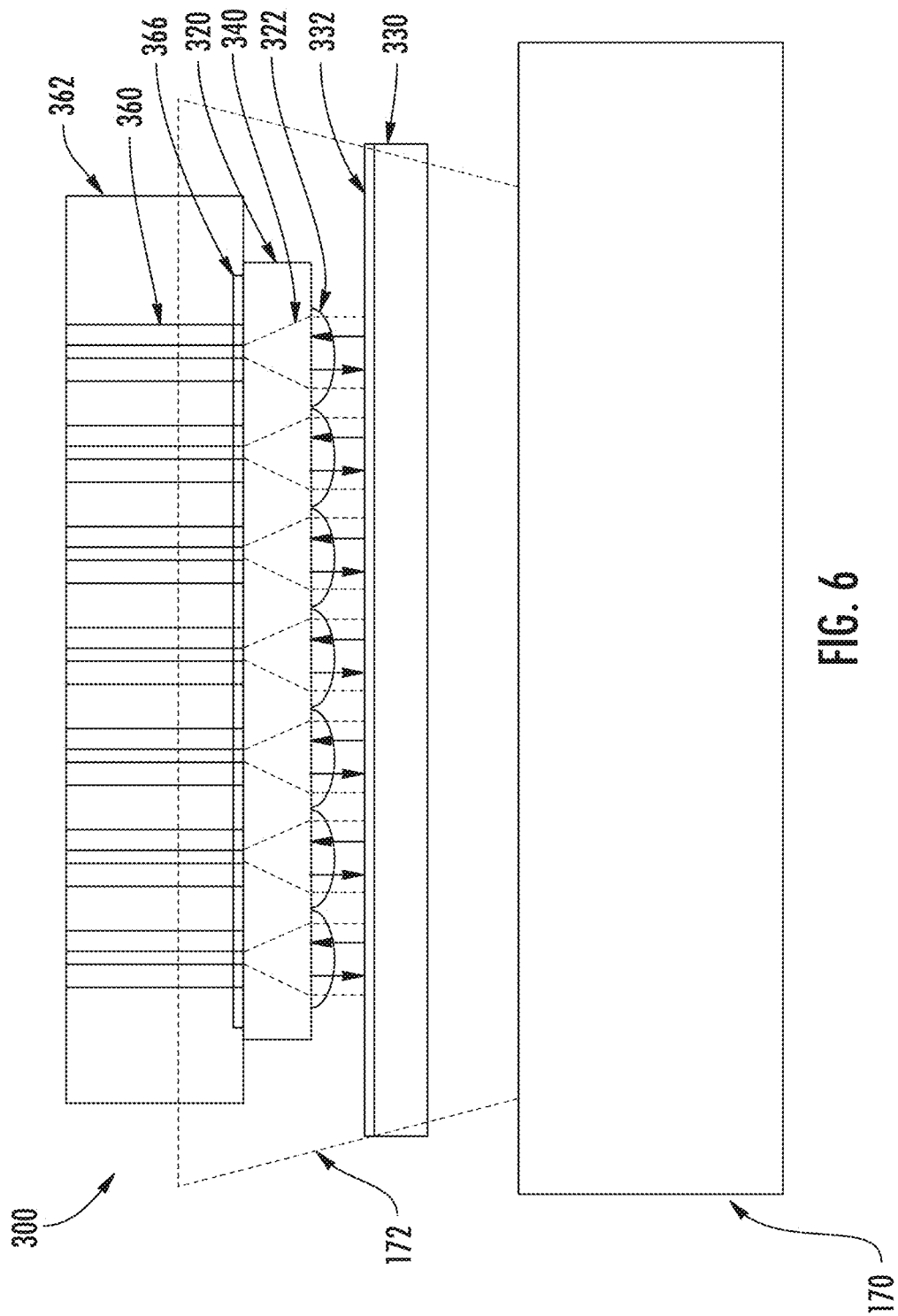

LENSED CONNECTOR FERRULE ASSEMBLIES AND METHODS OF FABRICATING THE SAME

RELATED APPLICATIONS

This application claims the benefit of priority under 35 U.S.C. § 119 of U.S. Provisional Application Ser. No. 62/712,734 filed on Jul. 31, 2018 the content of which is relied upon and incorporated herein by reference.

BACKGROUND

Field

The present disclosure generally relates to optical connections and, more particularly, lensed connector ferrule assemblies having an optical fiber aligned to a lens of a lens substrate and methods of fabricating the same.

Technical Background

Benefits of optical fiber include extremely wide bandwidth and low noise operation. Because of these advantages, optical fiber is increasingly being used for a variety of applications, including, but not limited to, broadband voice, video, and data transmission. Optical connections between mated optical connectors are commonly required to propagate optical signals between optical fibers of a first optical connector and a second optical connector. Optical connectors may employ butt coupling of polished single mode optical fiber ends. However, such optical connectors are highly sensitive to lateral misalignments. Further, butt coupled single mode optical fibers are not tolerant to dust or debris that may collect over the single fiber cores because the dust or debris can block a large portion of the guided mode field diameter, leading to unacceptable optical loss.

SUMMARY

In one embodiment, an optical assembly includes a ferrule and a mirror surface. The ferrule includes a lens holder having a lens substrate cavity and an engagement surface. The ferrule further includes a lens substrate disposed within the lens substrate cavity. The lens substrate has at least one lens. The mirror surface is coupled to the engagement surface such that the at least one lens is offset from the mirror surface by an offset distance.

In another embodiment, a lensed connector ferrule assembly includes a ferrule, a fiber holder, and at least one optical fiber. The ferrule includes a lens holder and a lens substrate. The lens holder includes a lens substrate cavity, a lens mounting surface within the lens substrate cavity, and an engagement surface. The lens substrate is disposed within the lens substrate cavity. The lens substrate includes at least one lens at a lens surface, and a fiber surface opposite from the lens surface. The lens substrate is coupled to the lens mounting surface, and the at least one lens is offset from the engagement surface by an offset distance. The at least one optical fiber is disposed within the fiber holder. The fiber holder and an end face of the at least one optical fiber is coupled to the fiber surface of the lens substrate by an adhesive.

In yet another embodiment, a method of assembling a lens ferrule assembly includes providing a connector ferrule assembly having a ferrule. The ferrule includes a lens holder having a lens substrate cavity and an engagement surface, and a lens substrate disposed within the lens substrate cavity. The lens substrate includes at least one lens at a lens surface and a fiber surface that is opposite the lens surface. The method further includes coupling a mirror surface to the engagement surface of the ferrule such that the at least one lens is offset from the mirror surface by an offset distance. The method further includes coupling a first end face of at least one optical fiber to a circulator device. An input of the circulator device is coupled to a light source and an output of the circulator device is coupled to a photodetector. The method also includes positioning a second end face of at least one optical fiber at the fiber surface of the lens substrate, and injecting a light beam into the circulator device such that the light beam enters the at least one optical fiber. The light beam is received by the at least one lens, reflected by the mirror surface, received by the at least one lens, provided to the at least one optical fiber, and at least a portion of the light beam is provided to the photodetector by the circulator device. The method further includes shifting a position of the second end face of the at least one optical fiber with respect to the fiber surface in at least one direction while measuring an optical power received by the photodetector, and positioning the second end face of the at least one optical fiber at a location on the fiber surface having a maximum optical power received by the photodetector. An adhesive is applied to the second end face of the at least one optical fiber and the fiber surface, and the adhesive is cured with the second end face of the at least one optical fiber at the location on the fiber surface having the maximum optical power.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

FIG. 6 schematically depicts and curing process for an optical assembly according to one or more embodiments described and illustrated herein;

DETAILED DESCRIPTION

Embodiments described herein are directed to lensed connector ferrule assemblies employing lenses for dust-tolerant expanded beam optical connections. The lensed connector ferrule assemblies described herein include a ferrule, a lens substrate having at least one lens within the ferrule, and at least one optical fiber optically coupled to the at least one lens. The lens receives a diverging beam from the optical fiber, and collimates the diverging beam for receipt by a mated lens of a mated lensed connector ferrule assembly. Embodiments of the present disclosure are further directed to methods for fabricating lensed connector ferrule assemblies that comprise aligning one or more optical fibers to one or more lenses on a lens substrate using an active alignment process involving retroreflection.

As described in more detail below, lateral misalignments of less than 0.5 µm between the optical fiber and the lens should be maintained for low loss optical interconnections. Unfortunately the lens substrate may not provide well-defined raised features that can be used for passive alignment. Therefore, embodiments described herein provide an active alignment approach where the lens substrate, which may include an array of lenses, is aligned to the one or more fibers (e.g., a fiber array) in a single assembly process.

The lensed connector ferrule assemblies described herein provide for expanded beam optical interconnections for optical connections. The ferrule of the embodiments described herein provides precision mechanical surfaces and features so that it can be passively aligned to a mating ferrule during connector-connector joining.

Various embodiments of lensed connector ferrule assemblies providing expanded beam interconnections and methods of fabricating lensed connector ferrule assemblies are described in detail below.

Traditional optical connectors employ butt coupling of polished single mode optical fiber ends (e.g., SMF-28), with guided mode field diameters of 8-10 µm. In such optical connectors, optical fibers are mounted in precision ceramic or plastic ferrules that provide precision reference surfaces via outside surfaces (in the case of single fiber ceramic ferrules, such as FC and LC connectors), or alignment pins (in the case of molded plastic fiber array connectors, such as MPO connectors). These precision reference surfaces allow single mode fiber cores to be laterally aligned to within <1.0 µm and often to within <0.5 µm, providing low loss optical connections with IL<0.05 dB.

Figure 1A:
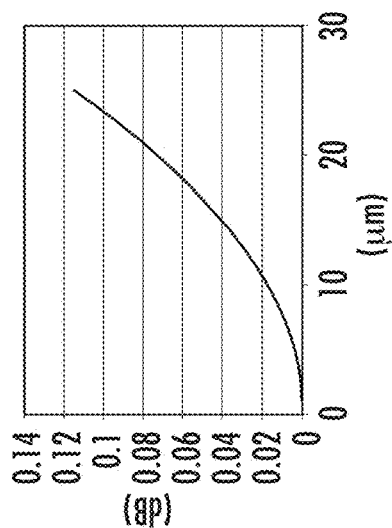
FIG. 1A is a graph depicting the insertion loss versus axial separation between an end face of a first optical fiber and an end face of a second optical fiber that are coupled in a butt-coupled arrangement.
Figure 1B:
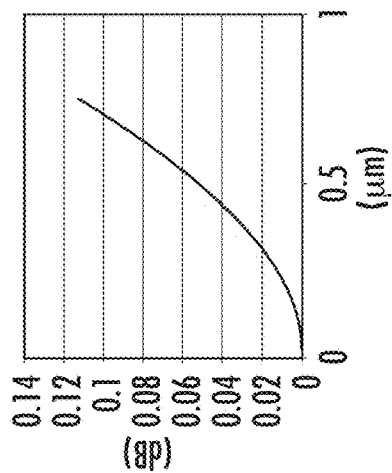
FIG. 1B is a graph depicting the insertion loss versus lateral offset between ends of butt-coupled first and second optical fibers.
Figure 1C:
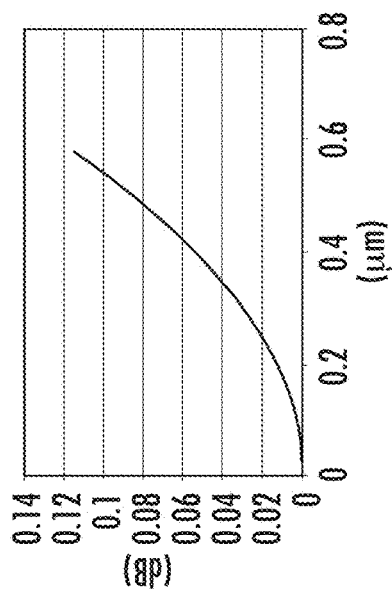
FIG. 1C is a graph depicting the insertion loss versus angular offset (angle units) between ends of butt-coupled first and second optical fibers.

Single mode optical interconnections are relatively insensitive to axial misalignment (e.g., <22 µm for <0.1 dB insertion loss (IL)), highly sensitive to lateral misalignments (e.g., <0.75 µm for <0.1 dB IL), and moderately sensitive to angular misalignment (e.g., <0.55° for <0.1 dB IL). FIGS. 1A-1C provides three plots of insertion loss versus various offsets to highlight these sensitivities for SMF-28 fiber (4.6 um mode field diameter for 1310 nm wavelength). In these and the graphs of FIGS. 1D-1I, the refractive indices of the material in the gap between the fibers is assumed to index matched to glass (n=1.5). Particularly, FIG. 1A is a graph depicting the insertion loss versus axial separation between an end face of a first optical fiber and an end face of a second optical fiber. FIG. 1B is a graph depicting the insertion loss versus lateral offset between ends of first and second optical fibers. FIG. 1C is a graph depicting the insertion loss versus angular offset (angle units) between ends of first and second optical fibers.

A problem with single mode fiber interconnections is that they are less tolerant to dust or debris that may collect over the single mode fiber core. For example, a dust particle that is 2-3 µm in diameter can block a large portion of the guided mode field diameter, leading to unacceptable optical loss.

One solution to making optical interconnections more tolerant to dust and debris is to expand the diameter of the optical beam at the optical interconnection plane. Multi-mode fiber cores (50-62.6 µm diameter) have been used to achieve more dust tolerant interconnections, but their optical bandwidth limitations makes them unsuitable for most medium reach applications (e.g., 300-3000 m) required by many data center applications.

The mode field of a single mode fiber may be expanded by positioning one or more lenses between two aligned single mode fiber cores in an optical connector. A large diameter collimated beam is formed between two lenses bonded to the ends of two optical fibers. An example collimated beam is a Gaussian beam with a mode field diameter (MFD) larger than 50 µm.

Figure 1F:
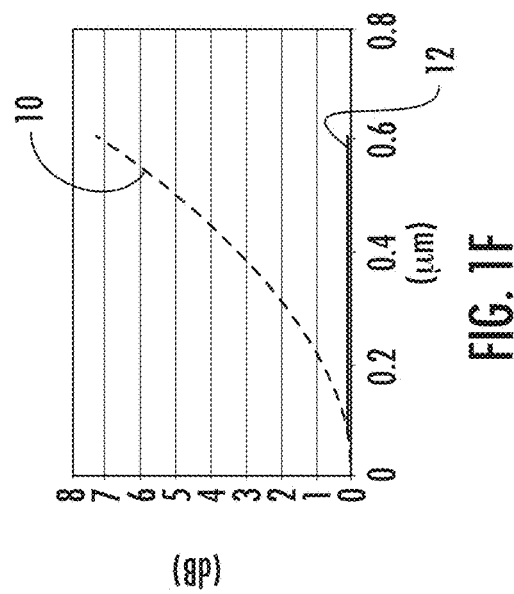
FIG. 1F is a graph depicting the insertion loss versus angular offset between first and second optical fibers that are coupled by an expanded beam optical connection.
Figure 1E:
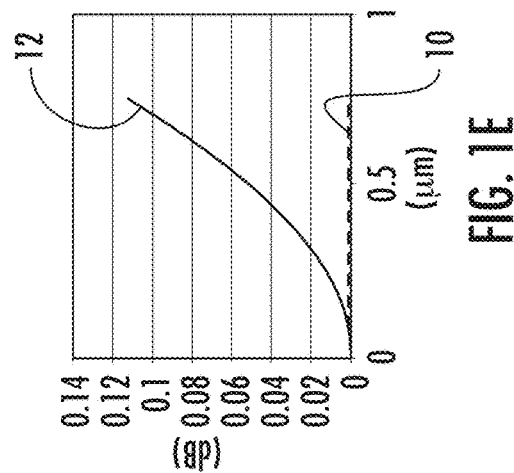
FIG. 1E is a graph depicting the insertion loss versus lateral offset between first and second optical fibers that are coupled by an expanded beam optical connection.
Figure 1D:
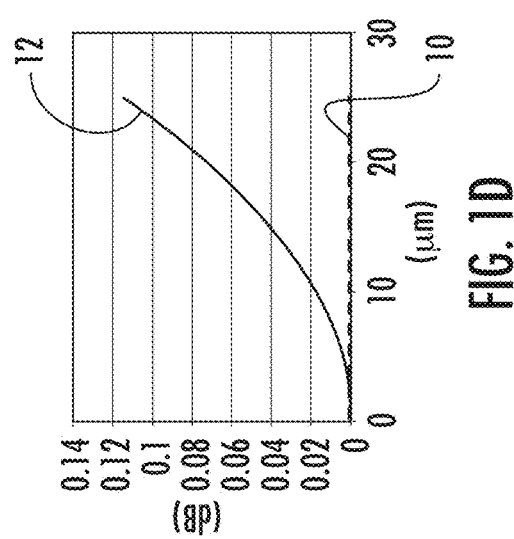
FIG. 1D is a graph depicting the insertion loss versus axial separation between first and second optical fibers that are coupled by an expanded beam optical connection.
Figure 1I:
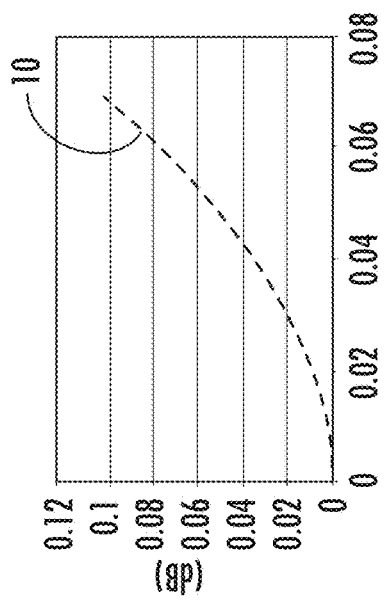
FIGS. 1G-1I are graphs depicting the insertion loss curves of FIGS. 1D-F, respectively, rescaled to offsets required to produce up to 0.1 dB insertion loss.
Figure 1H:
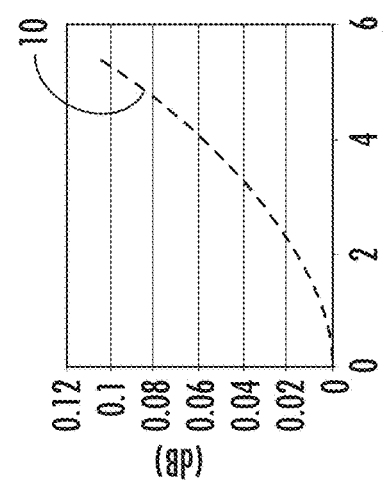
Figure 1G:
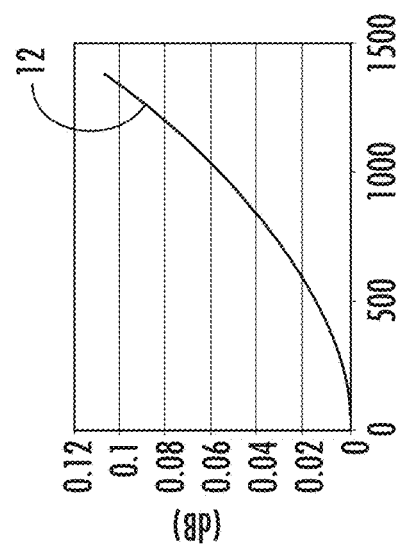

The resulting expanded beam optical interconnection can be made very tolerant of lateral offsets and axial offsets as compared to butt-coupled SMF-28 optical fiber interconnections. These benefits come at the expense of angular misalignment tolerance, however, which is far more sensitive for expanded beam optical interconnections. FIGS. 1D-1F plot the performance of a 70 µm mode field diameter (MFD) expanded beam optical interconnection (curve 10) as compared to the butt-coupled SMF-28 optical fibers (curve 12), using the same plot scales as used in FIGS. 1A-1C. Particularly, FIGS. 1D-1F plots insertion loss versus axial separation (FIG. 1D), lateral offset (FIG. 1E) and angular offset (FIG. 1F). The insertion loss curves for expanded beam interconnections (70 µm MFD) are plotted in FIGS. 1G-1I, respectively, rescaled to offsets required to produce up to 0.1 dB IL.

Thus the coupling interface between expanded beam interconnections can be made to be relatively insensitive to axial and lateral misalignments, but at the expense of higher sensitivity to angular misalignment. Further, precision assembly of the lens-fiber component requires alignment tolerances at the lens-fiber interface that mimic the alignment tolerances of two butt coupled SMF-28 fibers. Therefore, in assembling lens arrays to fiber arrays, lateral misalignment should be controlled to be less than 0.5 µm.

Embodiments of the present disclosure are directed to lensed connector ferrule assemblies comprising lenses that provide for expanded beam optical interconnections. Referring briefly to FIG. 12C, an example lensed connector ferrule assembly 400 coupled to a complementary lensed connector ferrule assembly 400' within a ferrule sleeve 485 is schematically illustrated. The lensed connector ferrule assembly 400 and the complementary lensed connector ferrule assembly 400' have the same components. Only the components of the lensed connector ferrule assembly 400 will be described for the sake of brevity.

Generally, the lensed connector ferrule assembly 400 includes a fiber holder 462 that maintains an array of optical fibers 460. As described in more detail below, the fiber holder 462 may be any component capable of maintaining the desired number of optical fibers (e.g., by bores or V-grooves, for example). Any number of optical fibers may be provided. The lensed connector ferrule assembly 400 further comprises a ferrule 410 comprising a lens holder 412 and a lens substrate 420 disposed within the lens holder 412. The lens substrate 420 has a fiber surface 421 and a lens surface 423 opposite the fiber surface. The lens surface 423 of the illustrated embodiment has an array of lenses 422 that correspond to the array of optical fibers 460. Any number of lenses 422 may be provided. Each lens 422 is illustrated as a convex lens at the lens surface 423. The array of optical fibers 460 is aligned with the array of lenses 422 such that they are optically coupled. As used herein, "optically coupled" means that more than 50% of the optical power emitted by a fiber is collimated by the corresponding lens, and conversely more than 50% of the optical power impinging on one lens is coupled to the mode or modes of the corresponding fiber.

The lens holder 412 has an engagement surface 419 that mates with the complementary engagement surface 419' of the complementary lensed connector ferrule assembly 400' such that the array of lenses 422 is optically coupled to a complementary array of lenses 422' of the complementary lensed connector ferrule assembly 400'.

Light 440A from source optical fibers 460 travels through the lens substrate 420 and is collimated by the lenses 422 to form dust-tolerant expanded (collimated) beams 440B, which propagate in free space (or, in some embodiments, epoxy or another optical material) and across an alignment plane 429 and into the complementary array of lenses 422'.

The complementary array of lenses 422' focuses the beams 440C into the complementary array of optical fibers 460'.

As stated above, any number of optical fibers and lenses may be utilized. Various embodiments of lensed connector ferrule assemblies are described in more detail below.

Figure 2:
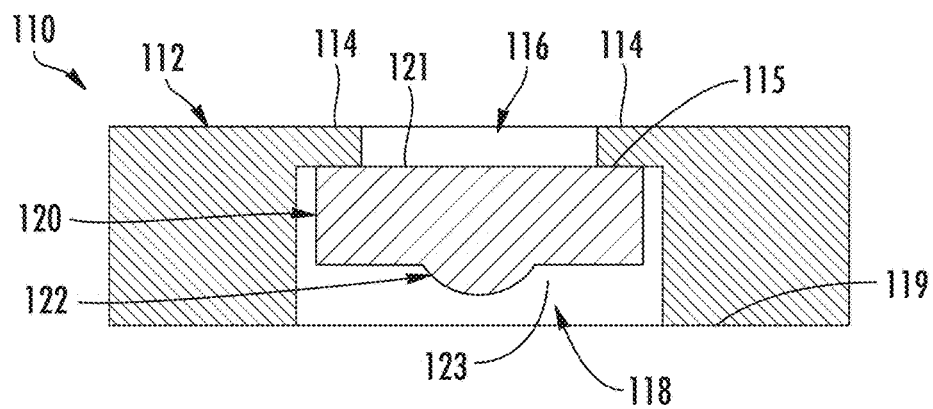
FIG. 2 schematically depicts a cross section view of an example ferrule according to one or more embodiments described and illustrated herein.

Referring now to FIG. 2, a cross-section of a ferrule 110 is schematically illustrated. The ferrule 110 includes a lens holder 112 and a lens substrate 120 having at least one lens 122. The lens holder 112 may be fabricated from any suitable material, such as, without limitation, metal, ceramic, glass, or filled plastic materials. The material of the lens holder 112 may be chosen such that it has a coefficient of thermal expansion (CTE) that is close to the CTE of the lens substrate 120 (e.g., +/−10 ppm/C), which may be glass, for example.

The lens holder 112 has a lens cavity 118. The lens substrate 120 is disposed within the lens cavity 118. The lens holder 112 also has lens supports 114 that project inward and define an aperture pocket 116. In the illustrated embodiment, an undersurface of the lens supports 114 provides a lens mounting surface 115. A portion (e.g., a perimeter portion) of the fiber surface 121 of the lens substrate 120 is coupled to the lens mounting surface 115 provided by the lens supports 114. In some embodiments, the lens supports 114 and lens mounting surface 115 are defined by a lens cavity 118 having an area that is larger than the area of the aperture pocket 116. For example, the lens cavity 118 may be circular and have a diameter that is larger than a diameter of the aperture pocket 116.

The fiber surface 121 of the lens substrate 120 may be coupled to the lens mounting surface 115 by an adhesive, for example. The material of the lens holder 112 and the adhesive joining layer(s) that bond the lens substrate 120 to the lens holder 112 may be designed to accommodate modest CTE mismatches with minimal influence on optical coupling due to the large lateral alignment tolerance of the expanded beam interconnection.

The lens holder 112 has a precision engagement surface 119 that mates with a complementary engagement surface of a complementary lensed connector ferrule assembly as well as a mirror surface during the active alignment processes described in detail below. The engagement surface 119 is substantially flat such that the angular alignment of a lensed connector ferrule assembly 400 and a corresponding mated a lensed connector ferrule assembly 400' is maintained to within, for example +/−0.3 degrees, and preferably within +/−0.1 degrees, and serves as an angular reference datum during fiber-to-lens alignment and also the angular reference datum in subsequent ferrule-to-ferrule mating during connector joining. In some embodiments, the engagement surface 119 provides precision raised features such as ribs and/or bumps (not shown) that minimize the contact area during connector mating to reduce the influence of debris trapped in the interface on expanded beam angular misalignment.

The at least one lens 122 is at the lens surface 123, and may be fabricated by any method. As described in more detail below with reference to FIGS. 11A-11C, the lens substrate 120 maybe photosensitive glass, and the at least one lens 122 may be formed using a photolithographic mask. Exposure to ultraviolet light and thermal processing cause spherical lenses to form on the lens surface 123 of the lens substrate 120. Example methods for producing lenses from a photosensitive glass substrate using a photolithographic mask are described in U.S. Pat. No. 4,518,222 May 21, 1985, which is hereby incorporated by reference in its entirety.

Table 1 summarizes properties of an example lens that is well-suited for expanded beam coupling involving SMF-28 optical fiber arrays. The lens diameter is selected to ensure that multiple lenses can be arrayed on pitches that are compatible with dense fiber arrays (e.g., 250 μm).

TABLE 1

| Sag μm | ROC μm | Physical diameter μm | Clear diameter μm | Glass thickness to lens vertex μm | Glass thickness to lens base μm | Adhesive thickness μm | NA (in glass, n = 1.5) | Air NA | Expanded beam MFD μm |
|---|---|---|---|---|---|---|---|---|---|
| 16 | 208 | 160 | 144 | 601 | 585 | 10 | 0.12 | 0.18 | 74 |

In other embodiments, the one or more lenses 122 may be polymer lenses deposited on the lens surface 123 of the lens substrate 120, which may be glass. As an example and not a limitation, a diamond turning process may create a precision mold master for molding polymer lenses on a flat glass substrate, such as liquid crystal display (LCD) glass. One advantage of this approach is that glass substrates with CTEs that closely match the CTE of the fiber holder used to hold the optical fibers in precise 2D arrays. For example, LCD glass substrates can be selected that have a close CTE match to Si wafers that can be etched to provide precise 2D fiber array holders. While typical molded polymer lens materials have a higher CTE than glass materials, the polymer material can have a low elastic modulus so that its mechanical properties do not dominate the CTE performance of the lens substrate. Another advantage of using polymer lenses is that the fabrication process enables lenses with shorter focal lengths than would be possible using the photolithographic approach. As a result, the glass substrate can be made thinner if needed to match standard LCD glass thicknesses. Lenses can also be formed with aspheric profiles for improved coupling efficiency if needed.

The lens surface 123 of the lens substrate 120 is parallel within +/−0.1 degrees to the engagement surface 119 of the lens holder 112.

Figure 3:
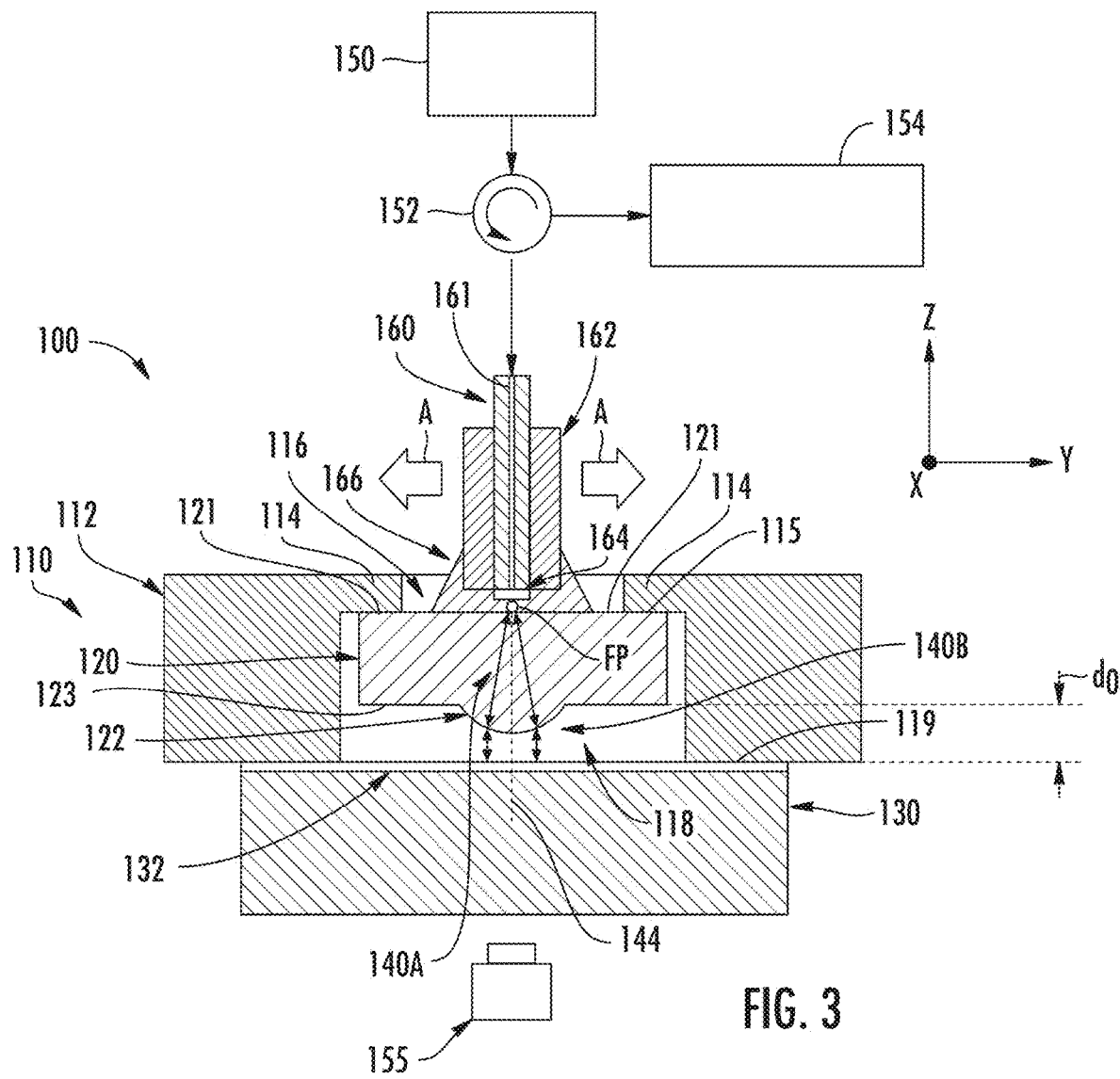
FIG. 3 schematically depicts a cross section view of an example optical assembly during an alignment process according to one or more embodiments described and illustrated herein.

Referring now to FIG. 3, a method of aligning at least one optical fiber 160 to at least one lens 122 of a lensed connector ferrule assembly is schematically illustrated. The ferrule 110, the optical fiber 160 and the fiber holder 162 are illustrated in cross-section. As used herein, the phrase "optical assembly" refers to a ferrule 110 with a mirror surface 132 coupled to the lens holder 112, and the phrase "lensed connector ferrule assembly" refers to a ferrule 110 and at least one optical fiber 160 without the mirror surface 132. FIG. 3 depicts an example optical assembly.

The method and system of aligning the optical fiber 160 to the at least one lens 122 by retroreflection comprises coupling a mirror surface 132 to the engagement surface 119. The mirror surface 132 is operable to reflect a light beam propagating through the lens 122 from the optical fiber 160, and establishes a lens optical axis 144 that extends normal to the mirror surface 132 through the focal point FP of the lens 122. The lens 122 is offset from the mirror surface 132 by an offset distance $d_o$. The mirror surface 132 may be any surface capable of reflecting light at the wavelength of the light beam. In some embodiments, the mirror surface 132 is provided on a mirror substrate 130. As a non-limiting example, the mirror substrate 130 may be made of glass. For example, in embodiments that use a camera 155 to determine the location of the fiber core 161 of the one or more optical fibers 160, the mirror substrate 130 may be glass and the mirror surface 132 may be a dichroic mirror reflective at at least one wavelength, for example in the near-infrared wavelength range, and tranmissive at at least one other wavelength, for example in the visible wavelength range, such that field of view of the camera extends through the mirror substrate 130 and the mirror surface 132.

This optical fiber is mounted in a fiber holder 162 and positioned so that its end face is in close proximity to the fiber surface 121 of the lens substrate 120. In some embodiments, the fiber end face is coated with an anti-reflective coating 164 (e.g., a magnesium fluoride coating). The fiber holder 162 is any device that can maintain one or more optical fibers 160 in a precise arrangement. For example, the fiber holder 162 may include one or more bores that receive one or more optical fibers 160. In another non-limiting example, the fiber holder 162 comprises at least one V-groove substrate that is coupled to a cap layer such the one or more optical fibers 160 are disposed within one or more V-grooves between the V-groove substrate and the cap layer. Other configurations are also possible.

In the alignment setup, a first end face of the optical fiber 160 is optically coupled to a circulator device 152. The input of the circulator device 152 is optically coupled to a light source, such as a laser or a broadband super-luminescent diode (SLED). An output of the circulator device 152 is optically coupled to a photodetector 154. The circulator device 152 may be any optical circulator capable of receiving a light beam from the light source 150, directing the light beam into the at least one optical fiber 160, receiving a reflected light beam from the mirror surface 132 that is propagating into the at least one optical fiber 160, and directing at least a portion of the reflected light beam toward the photodetector 154. The photodetector 154 is any device that is capable of measuring optical power of an optical signal.

During the alignment process, the light source injects a light beam into a first end face of the optical fiber 160. The second end face of the optical fiber 160 is in proximity to the fiber surface 121 of the lens substrate 120 such that a diverging beam 140A is emitted from the second end face of the optical fiber 160 and enters the lens substrate 120, which is transmissive to the wavelength of the diverging beam 140A. The diverging beam 140A is received by the lens 122, which collimates the diverging beam 140A into an expanded beam 140B. The expanded beam 140B is reflected by the mirror surface 132 and received by the lens 122, which focuses the beam as focused beam (also labeled as 140A) having a focal point FP proximate the fiber core 161 at the second end face of the optical fiber. The reflected beam then enters the optical fiber 160 and propagates toward the circulator device 152. The circulator device 152 directs at least a portion of the reflected beam toward the photodetector 154, which measures the optical power of the received beam.

The alignment process aligns the optical fiber 160 with respect to the lens 122 to minimize optical loss. A position of the second end face of the optical fiber 160 providing a maximum optical power received by the photodetector 154 is the position wherein the optical fiber 160 and the lens 122 (or multiple optical fibers and lenses) are in alignment. During the alignment process, the position of the second end face of the optical fiber 160 is shifted in one or more directions. FIG. 3 depicts a second end face that is laterally shifted at multiple positions in the x-axis and y-axis directions, as shown by arrows A. The optical fiber 160, the ferrule 110, or both may be physically moved to obtain the different lateral positions of the second end face of the optical fiber 160. At each position of the optical fiber 160, the photodetector 154 measures an optical power of the reflected beam. The lateral position of the second end face of the optical fiber 160 providing the maximum optical power is selected as the alignment position in the x and y directions.

In embodiments, the alignment process also comprises axially shifting a position of the second end face of the optical fiber 160 with respect to the fiber surface 121 of the lens substrate 120 in an axial direction along the z-axis while also detecting the optical power of the reflected beam using the photodetector 154. The position of the second end face of the optical fiber 160 providing the maximum measured optical power is the axial alignment position along the z-axis. This position may be where the focal point FP of the lens 122 is at the fiber core 161 at the second end face of the optical fiber 160. This process results in measurements at different axial distances of the second end face of the optical fiber 160 from the focal point FP of the lens.

In embodiments, the alignment also comprises angular alignment of the optical fiber 160 with respect to the fiber surface 121 of the lens substrate 120 and the lens 122 (i.e., an angular direction). The angular position of the optical fiber 160 is shifted at multiple angles with respect to the fiber surface 121 of the lens substrate 120 while measuring the optical power with the photodetector 154. The angular position of the optical fiber 160 yielding the maximum optical power is selected as the angular alignment orientation.

Once the alignment position of the second end face of the optical fiber 160 is determined in three dimensions, as well as the angular alignment position, the optical fiber 160 is oriented in the alignment position and angular alignment orientation and an adhesive 166 is cured to secure the optical fiber 160 to the fiber surface 121 of the lens substrate 120. For example, the adhesive 166 may be ultraviolet (UV) light curable adhesive such that curing of the adhesive is performed by applying UV light to the adhesive. As a non-limiting example, UV light may be provided from multiple azimuthal directions to cure the adhesive.

The mirror surface 132 is then removed from the lens holder 112. After assembly, the ferrule 110 can provide a collimated beam of light that is normal to the mirror surface 132.

Figure 4A:
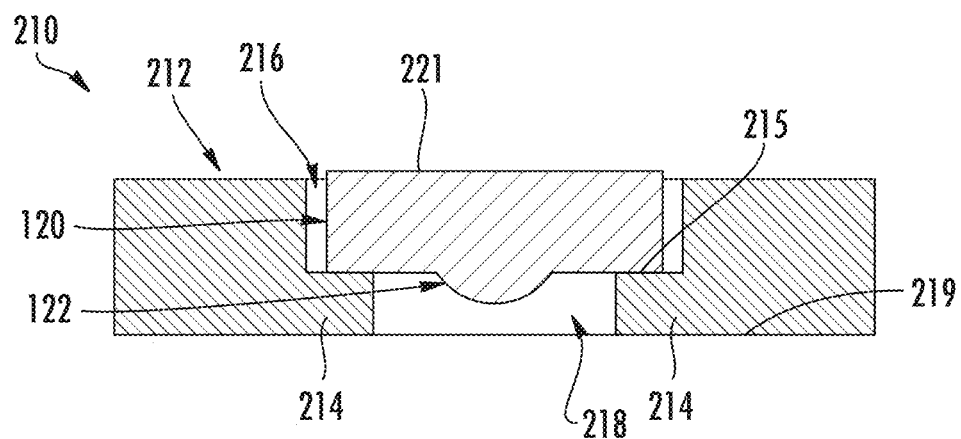
FIG. 4A schematically depicts a cross section view of another example ferrule according to one or more embodiments described and illustrated herein.

An alternative example lens holder 212 of an alternative example ferrule 210 is schematically depicted in FIG. 4A. In this example embodiment, the lens mounting surface 215 is opposite the engagement surface 219, so that the lens substrate 120 is inserted into lens substrate cavity 216 from the upper side of the lens holder 212. The lens mounting surface 215 is defined by supports 214 that project inward. The lens 122 projects into an aperture pocket 218.

Figure 4B:
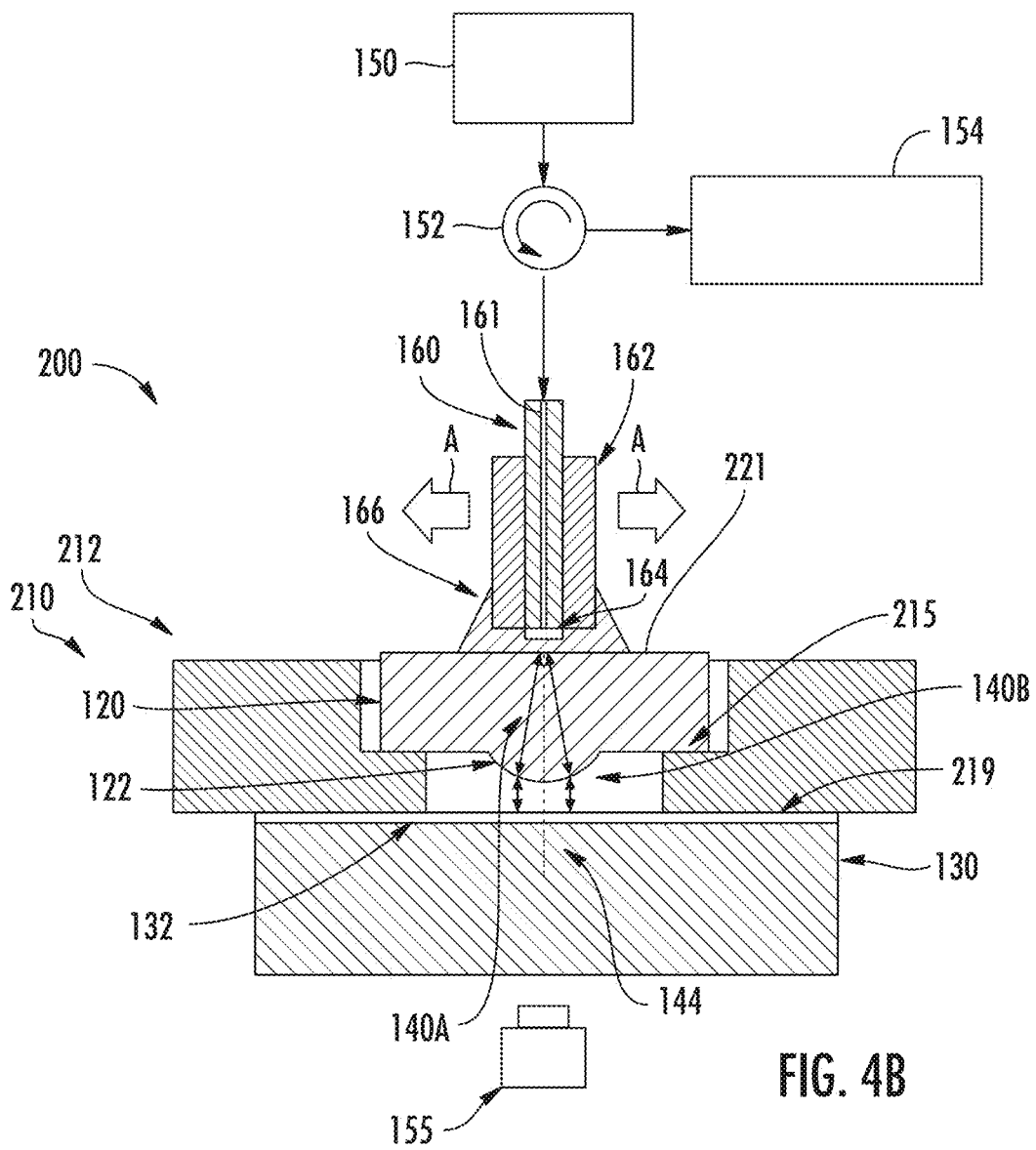
FIG. 4B schematically depicts a cross section view of another example optical assembly during an alignment process according to one or more embodiments described and illustrated herein.

FIG. 4B schematically illustrates an example optical assembly 200 using the lens holder 212 depicted in FIG. 4A during an alignment process. Alignment of the optical fiber 160 and the fiber holder 162 to the lens 122 is carried out using a process as described above with respect to FIG. 3. The approach of FIGS. 4A and 4B may be advantageous because any downward force applied to the lens substrate 120 during fiber alignment will place the adhesive 166 that joins the lens substrate to the lens holder in compression instead of tension. Also the ferrules could be fabricated inexpensively from precision shim stock that is stamped or laser-cut to form apertures/cavities and other alignment features.

For both designs of FIGS. 3 and 4B, if the mirror surface 132 is partially transparent, then alignment of the optical fiber 160 and the fiber holder 162 to the lens 122 may be observed through the mirror to aid in coarse alignment of these components. For example, a camera 155 can be positioned below the mirror surface 132 with its lens oriented upward so that multiple lenses 122 can be viewed simultaneously during optical fiber 160 alignment. The camera 155 can detect the fiber core position of the optical fiber 160 by observing features of the fiber holder 162, or by directly imaging light from the optical fiber 160 as it passes through the lens substrate 120.

If the adhesive 166 is non-uniformly exposed to UV light during curing, it can shrink asymmetrically so that the optical fiber 160 is laterally misaligned away from the lens optical axis 144. One solution is to provide UV illumination during curing from below the mirror surface 132, so that the entire adhesive interface between the fiber holder 162 and the lens substrate 120 is exposed to the same amount of UV light. A glass substrate with a dichroic mirror coating can provide effective transmission at UV wavelengths, and reflection at infrared (IR) wavelengths provided by the light source 150 during the fiber-lens alignment process.

Figure 5:
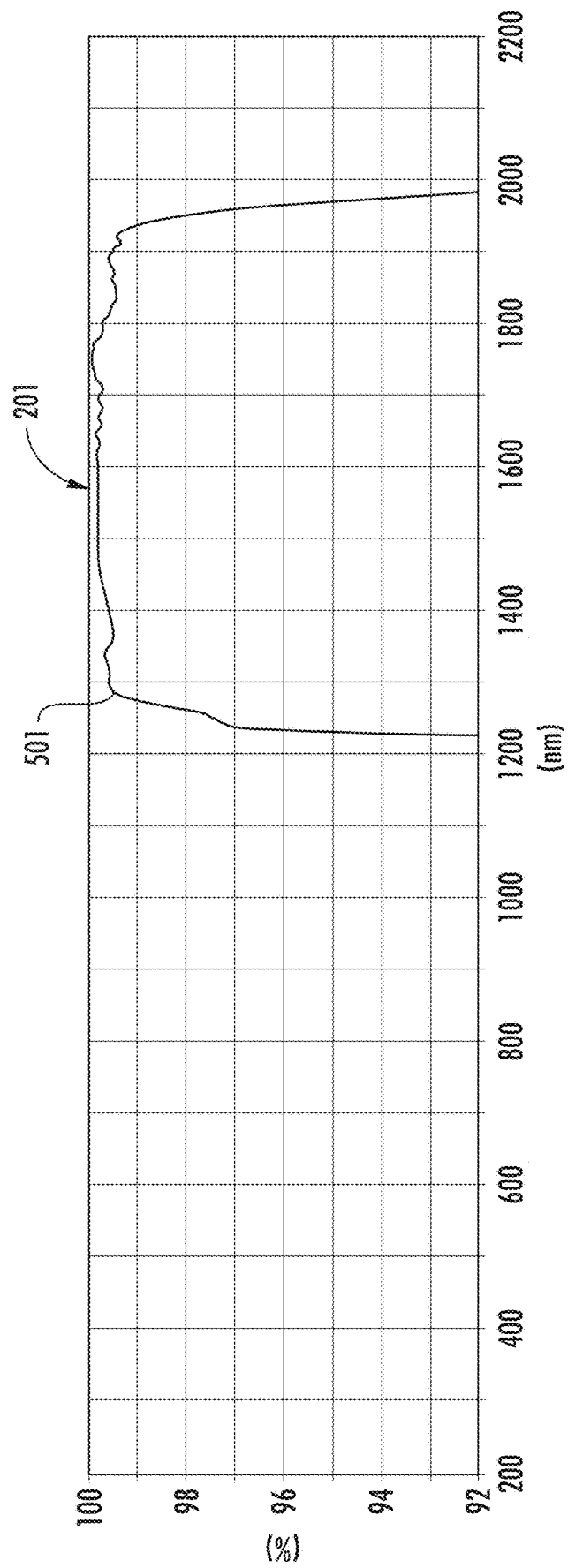
FIG. 5 is a graph depicting the reflection response of an example dichromic mirror according to one or more embodiments described and illustrated herein.

FIG. 5 provides a plot of reflection for an example dichroic filter (BB05-E04-Ø½" Broadband Dielectric Mirror, 1280-1600 nm sold by Thorlabs of Newton, N.J.), where the reflection response plotted as curve 201. The Y-axis is reflectance (%) and the X-axis is wavelength (nm). This example dichroic filter would enable adhesive exposure to UV or other curing light in an even symmetric manner to reduce adhesive induced movement during curing.

FIG. 6 schematically illustrates a cross-sectional view of an example lensed connector ferrule assembly 300 having a fiber holder 362 maintaining an array of optical fibers 360 and disposed on a lens substrate 320 having an array of lenses 122. The lens holder is omitted from FIG. 6 for simplicity. A UV light source 170 is positioned beneath a mirror substrate 330 and mirror surface 332 that is transmissive to UV light 1712 emitted by the UV light source 170. The UV light 172 cures an adhesive 366 that secures the fiber holder 362 to the lens substrate 320. UV illumination from the bottom may be beneficial in the assembly of lens arrays because it may be difficult to provide uniform UV illumination to the fiber-lens interface from the sides or the top.

Figure 7A:
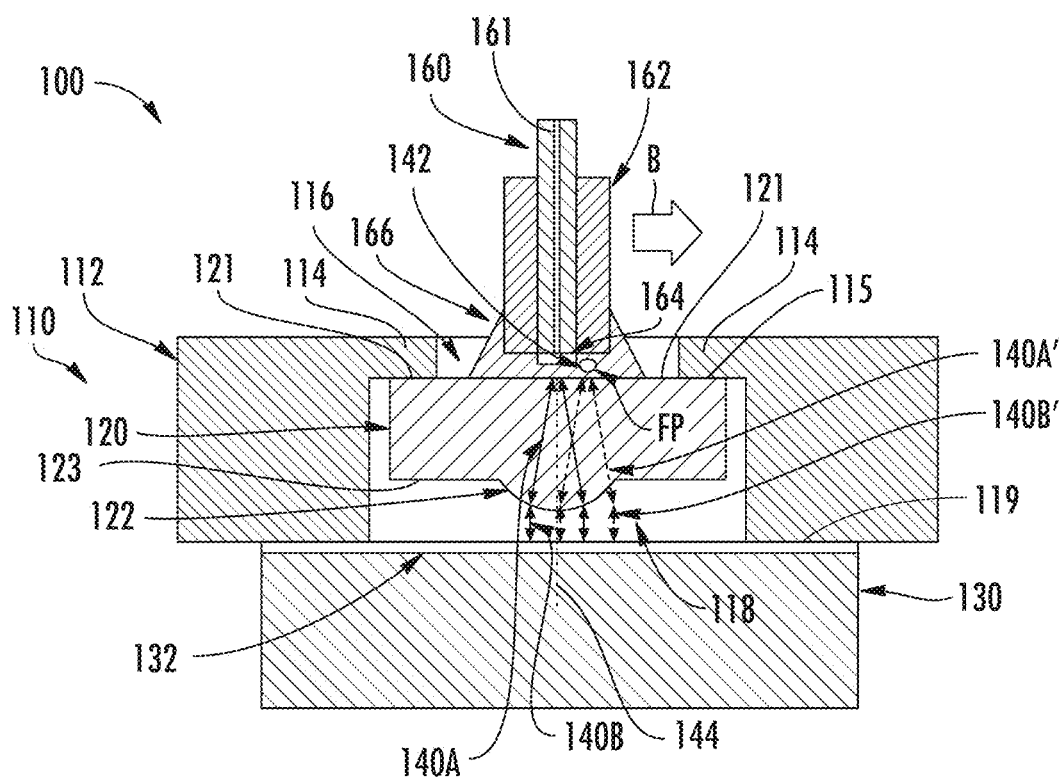
FIG. 7A schematically depicts an example optical assembly having a lateral misalignment according to one or more embodiments described and illustrated herein.

The influence on fiber-lens misalignment on the focal point of the reflected beam and coupling loss will now be described. Small misalignments will affect optical coupling during the mirror retroreflection alignment process. Referring to FIG. 7A, the optical assembly 100 shown in FIG. 3 is schematically illustrated. FIG. 7A shows how lateral misalignment of the fiber core 161 of the optical fiber 160 relative to the lens optical axis 144 influences coupling losses. When the fiber core 161 is misaligned laterally as shown by arrow A, the diverging beam 140A diverging from the fiber core 161 falls on the lens 122 at a location 142 off the lens optical axis 144. The lens 122 converts this lateral shift in focal location to an angular shift in expanded beam 140B propagation, causing the expanded beam 140B to propagate at an acute angle relative to the lens optical axis 144. After the expanded beam reflects off the mirror surface 132 as reflected expanded beam 140B', it doubles this acute angle so that, when the lens 122 refocuses the focused reflected beam 140A', it refocuses it at a lateral location further off the optical axis than the original fiber core location. This lateral shift in beam focus location away from the fiber core 161 introduces an increase in optical coupling loss that is detected at the photodetector 154. By moving the optical fiber 160 around laterally, a position can be identified where optical coupling losses are minimized, as described above.

Figure 8C:
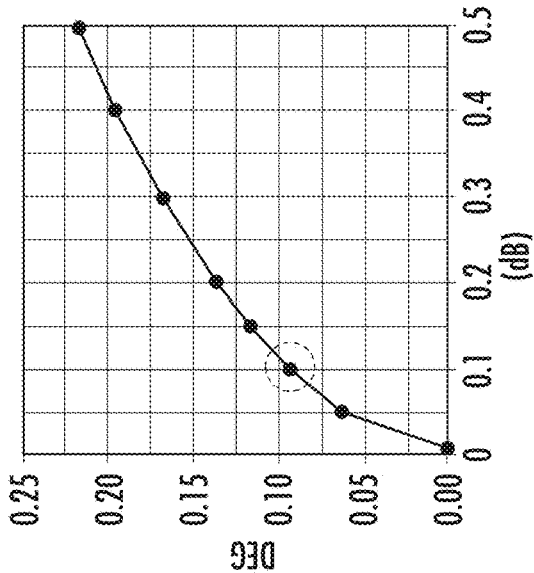
FIG. 8C is a graph depicting lens-to-lens angular offset versus optical loss according to one or more embodiments described and illustrated herein.
Figure 8B:
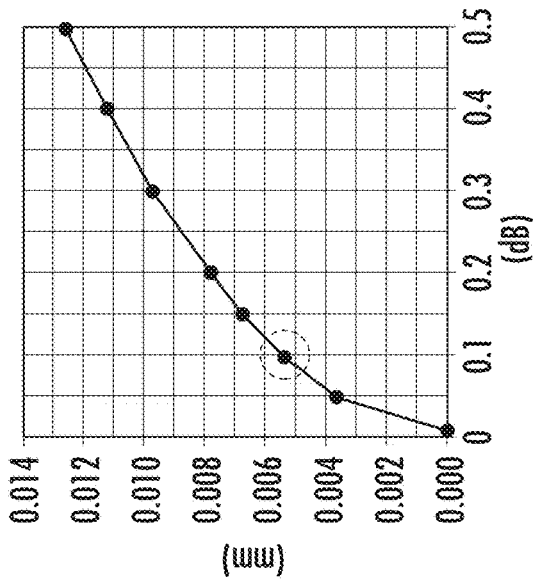
FIG. 8B is a graph depicting lens-to-lens lateral offset versus optical loss according to one or more embodiments described and illustrated herein.
Figure 8A:
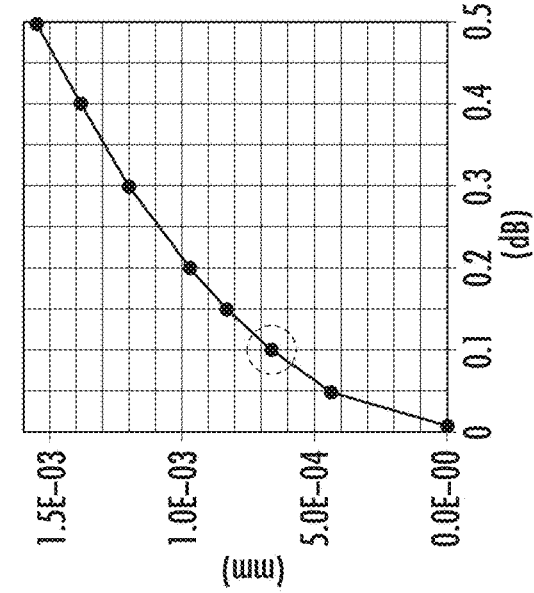
FIG. 8A is a graph depicting lateral offset in fiber-to-lens alignment versus optical loss according to one or more embodiments described and illustrated herein.

FIG. 8A plots lateral offset in fiber-to-lens alignment in millimeters against optical loss in dB. As shown in FIG. 8A, lateral alignment between the optical fiber and the lens may be important. To achieve less than 0.1 dB optical loss, the lateral offset should be less than 0.5 µm, which is comparable to lateral misalignment sensitivity for SMF-28 fiber).

Figure 7B:
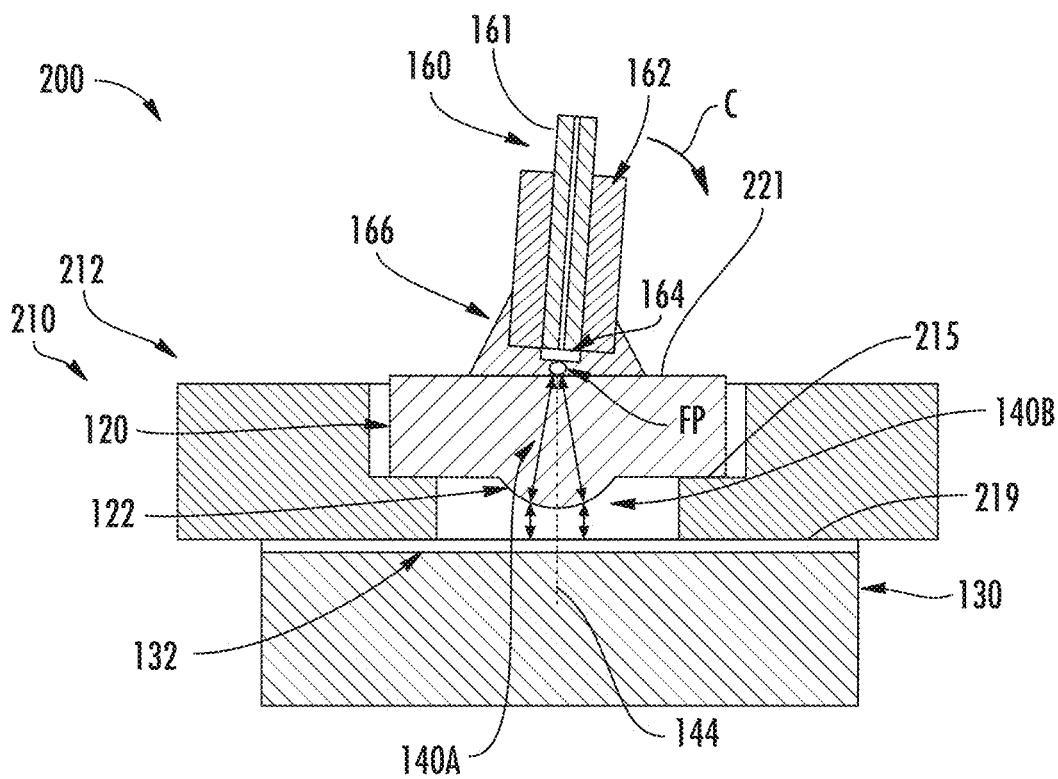
FIG. 7B schematically depicts an example optical assembly having an angular misalignment according to one or more embodiments described and illustrated herein.

During fiber-to-lens alignment, it is also possible for the fiber and fiber holder to be angularly misaligned from the lens optical axis 144 as shown in FIG. 7B. FIG. 7B shows an optical assembly 200 similar to the one depicted in FIG. 4B. The optical fiber 160 has an angular rotation as indicated by arrow C. Thus, the optical fiber 160 is not normal to the fiber surface 121 of the lens substrate 120. In this case, if the fiber core 161 at the fiber end face is located at the focal point FP of the lens 122, then as the diverging beam 140A diffracts out of the fiber core 161 it diffracts at an angle relative to the lens optical axis 144. The lens 122 converts this angular misalignment of the diverging beam 140A to a lateral shift of its expanded beam 140B. While the expanded beam 140B is laterally shifted (as in the shift to the left as shown in FIG. 7B), its propagation direction is parallel to the lens optical axis 144 of the lens 122. When the expanded beam 140B is incident on the mirror surface 132 it reflects as reflected expanded beam 140B' and follows the same path in reverse, so that it is focused by the lens 122 as focused reflected beam 140A' back to the same fiber core 161 location where it originated, producing no significant change in insertion loss (assuming the adhesive index of reflection is closely matched to the lens substrate index of refraction).

A portion of the expanded beam 140B may be clipped by the limited diameter of the spherical lens 122. Depending on the diameter of the expanded beam 140B, losses may also occur due to spherical aberration. In general, the alignment configuration is insensitive to small angular misalignments of the optical fiber 160 relative to the lens substrate 120. For this reason, it may not be important that the back surface wedge of the lens substrate 120 be controlled to tight angular tolerances, and slight angling of the lens substrate 120 relative to the engagement surface 219 can be accommodated without significant optical loss.

Figure 7C:
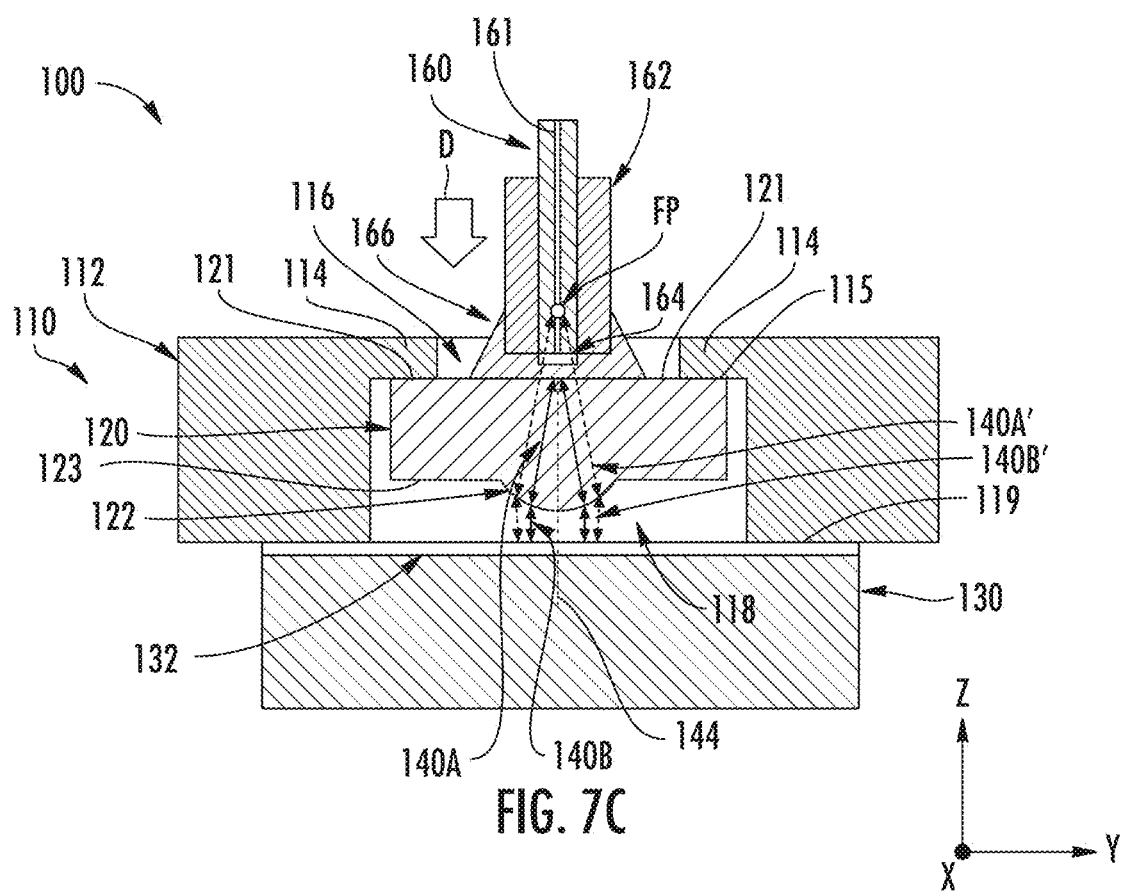
FIG. 7C schematically depicts an example optical assembly having an axial misalignment according to one or more embodiments described and illustrated herein.

If the fiber end face of the optical fiber 160 is positioned at an axial location away from the focal point FP (i.e., along the z-axis), then additional optical losses can result. FIG. 7C schematically illustrates a configuration where the fiber end face of the optical fiber 160 is positioned close to the fiber surface 121 of the lens substrate 120. The diverging beam 140A from the fiber core diffracts as it propagates within the lens 122, and then as it passes through the lens 122 surface it forms an expanded beam 140B that is diverging instead of collimated. The diverging beam continues to increase in diameter as it reflects off the mirror surface 132 as reflected expanded beam 140B', and when it meets the curved lens surface of the lens 122 it focuses as focused reflected beam 140A' at a location that is further away from the lens. This focal point shift relative to the fiber core position is equivalent to an axial misalignment that introduces optical coupling losses.

To achieve less than 0.1 dB optical loss (which is about twice as sensitive as axial misalignment sensitivity for SMF-28 fiber), the axial alignment between the end face of the optical fiber and the focal point of the lens should be less than 12 µm.

In addition to fiber-to-lens misalignment, lens-to-lens misalignment between mated lensed connector ferrule assemblies also contribute to optical loss, as described in more detail below with respect to FIGS. 11 and 12A-12C. Lens-to-lens lateral offset and angular offset contribute to optical loss. FIG. 8B plots lens-to-lens offset (mm) versus optical loss (dB) for an expanded beam having about 75 µm MFD. FIG. 8C plots lens-to-lens angular offset (degrees) versus optical loss (dB) for an expanded beam having about 75 µm MFD.

Angular alignment may be of importance because any small debris trapped between the ferrule angular alignment flat surfaces can introduce undesirable insertion losses. A target maximum angular misalignment is about 0.1°. For example, if an engagement surface of a lens holder is 3 mm wide, then a debris particle that is 5 µm in diameter will introduce an angular misalignment of 0.1°. With respect to lateral alignment between the lenses, about 5 µm lateral misalignment provides <0.1 dB loss. Axial alignment may be of minor importance given the long Rayleigh range of the expanded beams.

Optical coupling loss arises from multiple misalignment contribution sources. One design approach is to assume that a small amount of insertion loss (e.g., 0.1-0.2 dB) can be expected from each misalignment source. Taking the various misalignment sources and their contributions together at random, an estimate of overall mated connector insertion loss can be set at about 1 dB. Table 2 summarizes this result, highlighting sources of misalignment during assembly and connector mating.

TABLE 2

Example Specifications for ~1 dB Total Optical Loss for Mated Connectors

| Fiber-Lens Lateral Offset | Lens-Lens Lateral Offset | Lens-Lens Angular Offset |
|---|---|---|
| ~±0.7 µm ~±0.4 µm of systematic errors | ~±5 µm | ~±0.1° |

A simulation model was been developed to explore the dependence of expanded beam diameter on various design and performance parameters. The model is based on a closed-form Gaussian beam coupling model, with key parameters listed in Table 3.

TABLE 3

| Parameter | Value | Units | Description |
|---|---|---|---|
| gap n | 1 | | Index of refraction of gap between mated lenses |
| lens n | 1.5 | | Index of refraction of lens |
| lambda | 1.31 | µm | Wavelength |
| IL | 0.1 | dB | IL threshold (used for maximum offset calculations) |
| Connector width | 3 | mm | Width of connector flat mating surfaces |
| SMF waist | 4.6 | µm | Beam waist of SMF-28 guided mode |

TABLE 3-continued

| Parameter | Value | Units | Description |
|---|---|---|---|
| Lens scale factor | 2 | | Scaling factor for lens (how much bigger lens is compared to MFD) |

Figure 9A:
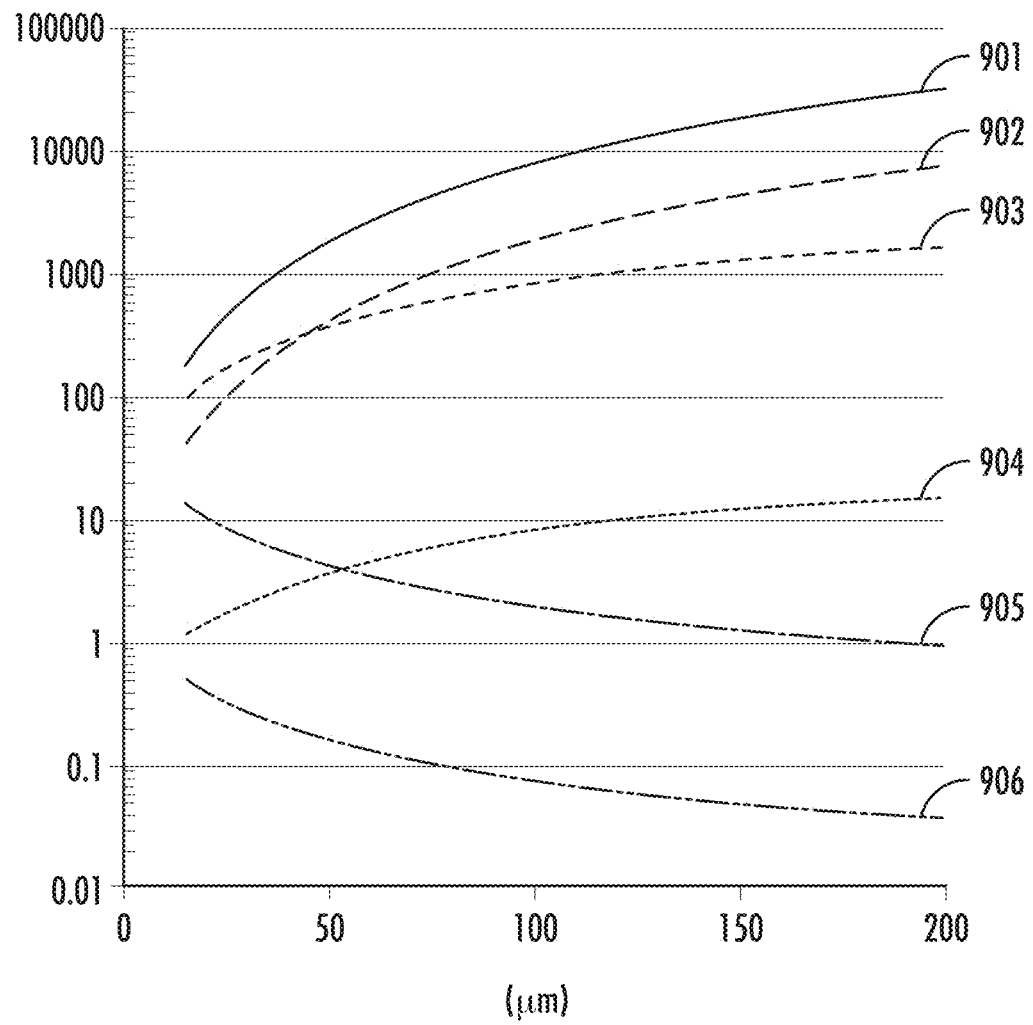
FIG. 9A is a graph depicting various parameters versus beam diameter according to one or more embodiments described and illustrated herein.

Simulation results are plotted in FIG. 9A over a range of beam diameters from 15 to 200 µm. The x-axis is beam diameter and the y-axis is µm or degrees. The plotted parameters in the graph of FIG. 9A are as follows:

Curve 901—beam area (µm$^2$): The total area of the expanded beam, measured from the 1/e$^2$ intensity point. The beam area provides a relative measure of dust and debris tolerance, in that larger beam diameters are expected to be more dust tolerant than small beams. Curve 901 shows that small changes in beam diameter result in larger changes in beam area.

Curve 902—Axial offset (µm): Maximum amount of lens-to-lens axial offset between mated connectors allowed before introducing a 0.1 dB insertion loss. The plot shows that for even the smallest beam diameters (15 µm), the axial offset distance is already quite large (30 µm).

Curve 903—Focal length (µm): The lens focal length required based on diffraction of the SMF-28 guided beam out to the target beam diameter of the expanded beam. Curve 903 shows that for lens substrates of practical thickness (e.g., >300 µm) the beam diameter should be greater than 40 µm.

Curve 904—Lateral offset (µm): Maximum amount of lens-to-lens lateral offset allowed before introducing a 0.1 dB insertion loss. The plot shows lateral offset variation from 1 to 11 um as the beam diameter is increased, indicating that practical beam diameters are likely over 50 um.

Curve 905—Perimeter gap (µm): Based on the physical width of the lens array (assumed to be 3 mm), this parameter estimates the maximum gap (or equivalently the maximum size of a hard piece of debris) that can be tolerated at a location around the perimeter of the lens array (e.g., in the flat alignment surface region). As with the angular offset parameter, larger beam diameters reduce the maximum perimeter gap: 10 µm for a 20 µm beam diameter, to ~5 µm for a 40 µm beam diameter, and 2.7 µm for a 70 µm diameter beam. Larger beam diameters will tolerate smaller and smaller maximum particle sizes, which is problematic for practical connectors.

Curve 906—Angular offset (µm): Maximum amount of lens-to-lens angular offset allowed before introducing a 0.1 dB insertion loss. Larger beam diameters lead to increasingly tight angular alignment tolerances. A beam diameter of about 70 µm yields a maximum angular offset of 0.1°.

Figure 9B:
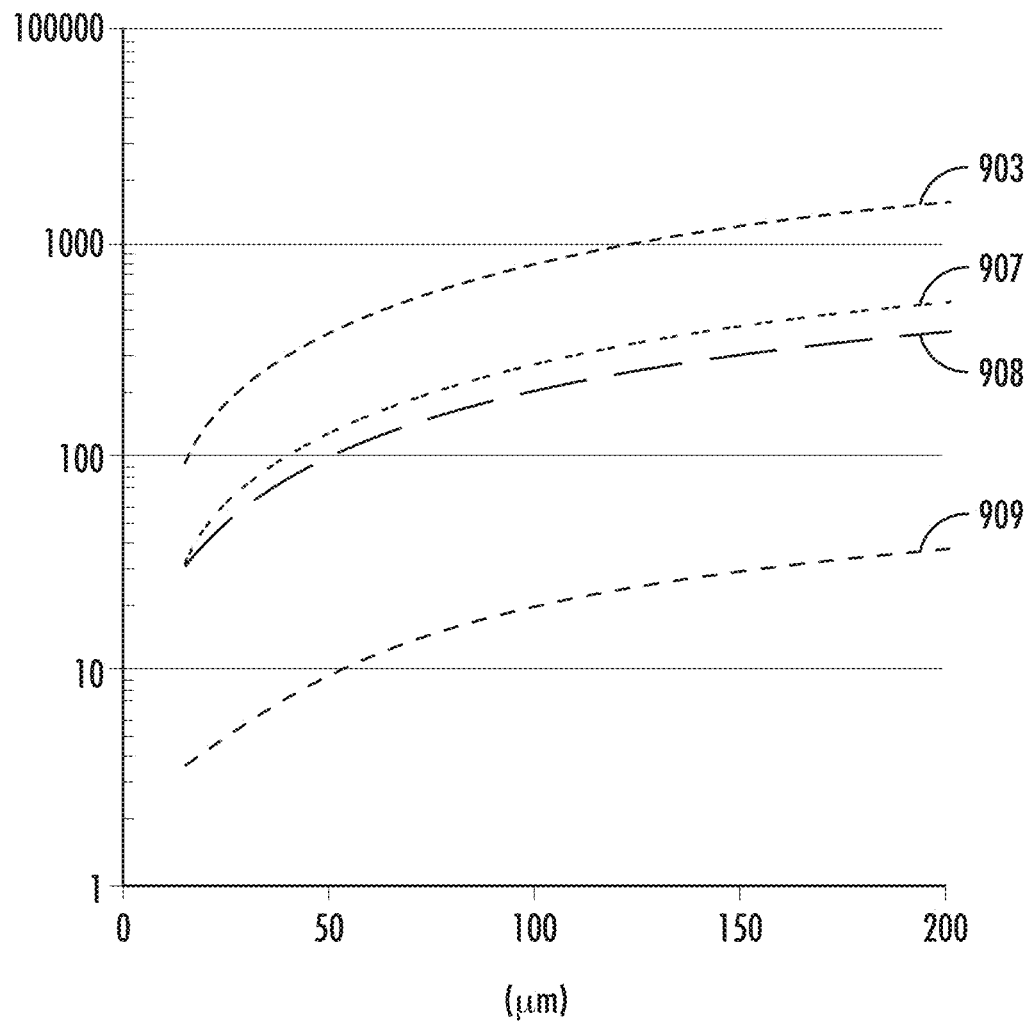
FIG. 9B is a graph depicting various parameters versus beam diameter according to one or more embodiments described and illustrated herein.

Additional lens design parameters from the simulation are plotted in FIG. 9B, where focal length (curve 903) is also plotted as in FIG. 9A. The additional lens design parameters are as follows:

Curve 907—Lens radius of curvature (µm): This parameter scales with the focal length.

Curve 908—Lens diameter (µm): Lens diameter is based on the lens scaling factor (defined equal to 2). This parameter sets a limit for the maximum fiber array pitch that can be supported by a given lens array design. For example, to maintain fibers on a 125 µm pitch the beam diameter cannot exceed 62.5 µm.

Curve 909—Lens height (μm): This parameter should be considered when the lenses are formed by the photolithographic process described herein. The photolithographic lens process has limitations on the maximum height for formed lenses at various lens diameters. The lens height is shown to increase with lens diameter, indicating that fabrication of lenses for larger diameter beams (e.g., >100 μm) may not be practical.

Figure 10:
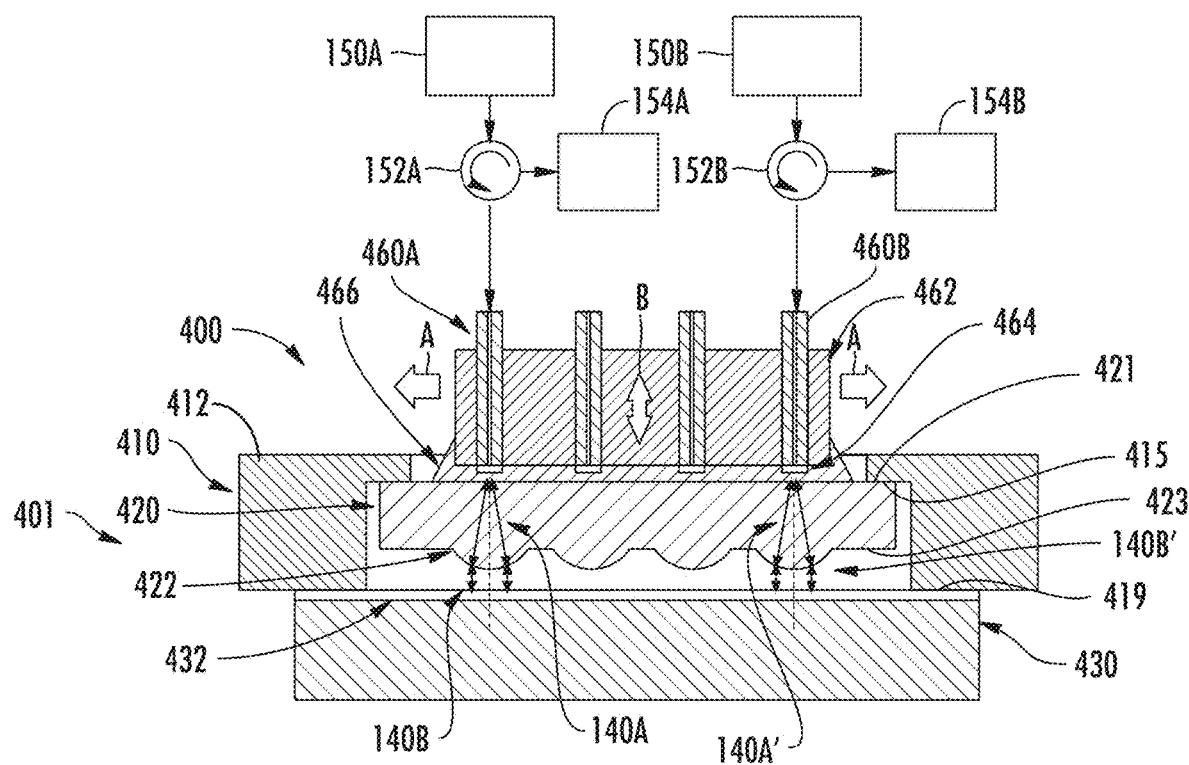
FIG. 10 schematically depicts a cross section view of an example optical assembly having an array of optical fibers and an array of lenses in an alignment process according to one or more embodiments described and illustrated herein.

As stated above, embodiments may comprise a ferrule having an array of optical fibers that are aligned to an array of lenses. FIG. 10 provides an example cross-section view of an array of optical fibers 460 held in a fiber holder 462. Generally, an optical assembly 401 includes a lensed ferrule connector assembly 400 and a mirror surface 432. The lensed ferrule connector assembly 400 includes a fiber holder 462 that maintains an array of optical fibers 460. The fiber holder 462 is configured to maintain the array of optical fibers 460 at a precise pitch. Precision holes may be drilled in the fiber holder 462 using laser ablation and/or chemically assisted etching processes. Alternatively, the fibers may be held in a fixed array using other alignment techniques, such as stacked glass V-groove substrates.

Any number of optical fibers 460 may be provided. The end faces of the optical fibers 460 may have a suitable anti-reflective coating 464 in some embodiments. The lensed connector ferrule assembly 400 further comprises a ferrule 410 comprising a lens holder 412 and a lens substrate 420 disposed within the lens holder 412. The lens substrate 420 has a fiber surface 421 and a lens surface 423 opposite the fiber surface 421. The lens surface 423 of the illustrated embodiment has an array of lenses 422 that correspond to the array of optical fibers 460. Any number of lenses 422 may be provided. The array of optical fibers 460 is aligned with the array of lenses 422 such that they are optically coupled.

The lens holder 412 further includes a lens mounting surface 415. A portion of the fiber surface 421 of the lens substrate 420 is coupled to the lens mounting surface 415 (e.g., by an adhesive).

Figure 12A:
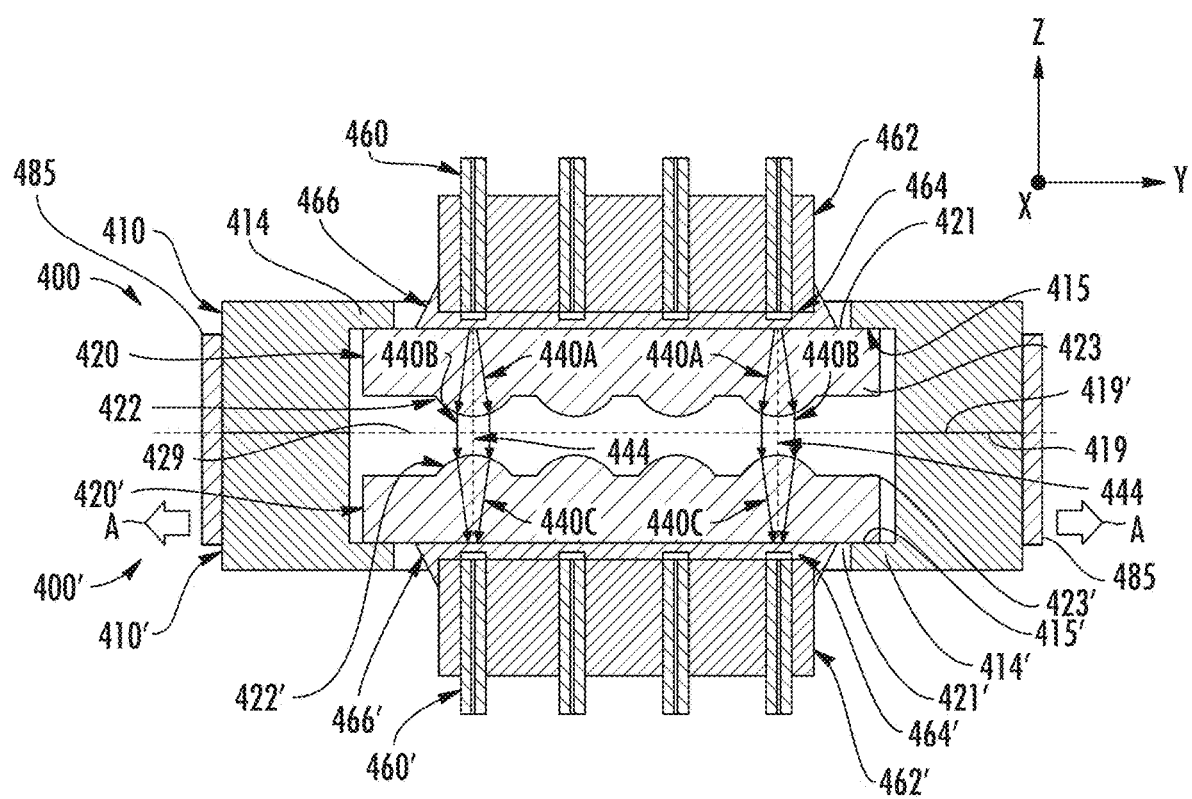
FIG. 12A schematically depicts a cross section view of example mated lensed connector ferrule assemblies each having an array of optical fibers and an array of lenses according to one or more embodiments described and illustrated herein.

To align the array of optical fibers 460 to the array of lenses 422, at least the outboard optical fibers are configured as shown in FIG. 12A. The outboard fibers 460A, 460B may be located at the ends of a one-dimensional array, or at all four or diagonal corners of a two-dimensional array. As shown in the example of FIG. 10, a first outboard optical fiber 460A is optically coupled to a first circulator device 152A, which is also optically coupled to a first light source 150A and a first photodetector 154A. A second output optical fiber 460B is optically coupled to a second circulator device 152B, which is also optically coupled to a second light source 150B and a second photodetector 154B.

The optical fibers 460 are aligned with their corresponding lenses using the alignment approach described above. A mirror surface 432, which may be provided on a mirror substrate 430, is coupled to the engagement surface 419 of the lens holder 412. To align a two-dimensional array, the alignment process may be carried out by measuring the lateral (x, y) position where maximum optical power is coupled for each of the outboard fiber coupling locations. Assuming the outboard lens 422 positions are approximately known (based on proper positioning of the lens substrate 420 in the lens holder 412, and biasing of the lens holder 412 into a known position in a mounting fixture). The fiber holder 462 can be rotated by a predefined amount (theta Z) to bring both outboard optical fibers 460 into coarse alignment with their corresponding lenses 422. This alignment process can be repeated to bring the optical fibers 460 into precise alignment with the lenses 422.

Figure 11:
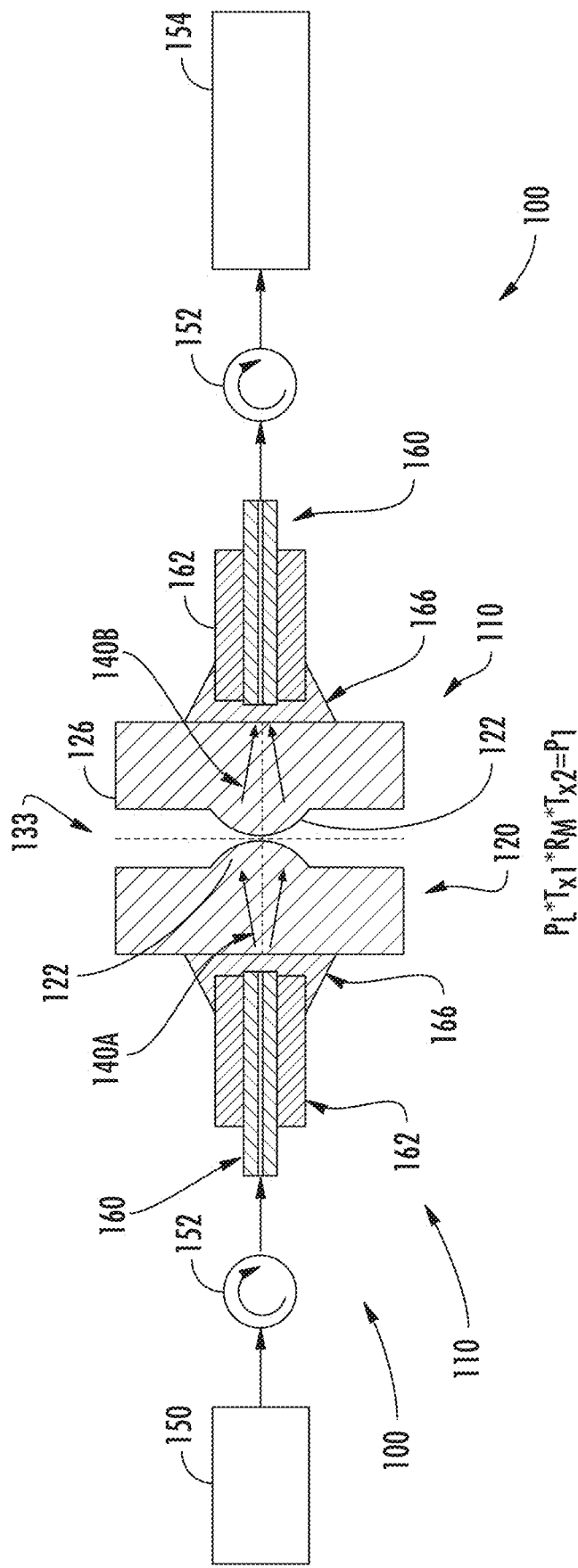
FIG. 11 schematically depicts an example method of determining insertion loss of a lensed connector ferrule assembly according to one or more embodiments described and illustrated herein.

The insertion loss of a single ferrule may be characterized after assembly (i.e., securing the at least one optical fiber to the fiber surface of the lens substrate) by placing it on a mirror surface. This measurement may be performed to detect unwanted lateral and axial shifts that occur due to uneven shrinkage after adhesive UV curing and thermal treatment. FIG. 11 shows an unfolded view of optical coupling through a ferrule 110 positioned on a mirror surface 133. It should be understood that right side of FIG. 11 is a mirror image of the ferrule 110 on the left side.

The total power Pi received at the photodetector 154 is given by the product $P_L * TX_1 * R_m * TX_2$, where all terms are in linear (e.g., transmission fraction, non-dB) units:

$P_L$ is the launched power in the fiber, defined at the fiber end face.

$R_m$ is the power reflectivity of the mirror, which can be measured separately.

$TX_1$ and $TX_2$ are the power transmission fractions associated with forward and reverse propagation through the lens 122 from and to the optical fiber 160.

It is assumed that the fiber end face does not have an antireflection coating and consequently it has a finite reflectivity when it is not terminated, and a negligible reflectivity when it is index-matched to the lens. The reflectivity of the fiber end face, along with the power transmission fractions through the lens 122 can be combined into a common term Tx. This term can be measured and used to characterize the IL performance of the optical assembly 100. For example, significant variation in the measured value of Tx could be used to flag defective components or unexpected process shifts.

The launched power term $P_L$ can be determined by launched light from the light source 150 into a single optical assembly 100, and then measuring the total power coupled through the ferrule 110 into a broad area detector or integrating sphere. Here it is assumed that all the light that exits the fiber end face is coupled through the lens 122, which must also have an AR coating. If back-reflections are expected at the fiber end face, the magnitude of Fresnel reflection loss can be calculated via knowledge of the indices of refraction of the optical fiber 160, adhesive 166, and lens substrate 120. Alternatively, the launched power term $P_L$ may be assessed by measuring power coupled out of the fiber prior to the optical assembly 100. In this case, Fresnel reflections at the fiber end face would also need to be subtracted from the measured power value.

Referring now to FIG. 12A, a lensed connector ferrule assembly 400 mated to a complementary lensed connector ferrule assembly 400' is schematically illustrated. The complementary lensed connector ferrule assembly 400' may include the same elements as the lensed connector ferrule assembly 400, as shown in FIG. 12A. Components of the complementary lensed connector ferrule assembly' are referenced by a prime symbol after their corresponding reference numbers.

The lens holder 412 has an engagement surface 419 that mates with the complementary engagement surface 419' of the complementary lensed connector ferrule assembly 400' such that the array of lenses 422 is optically coupled to a complementary array of lenses 422' of the complementary lensed connector ferrule assembly 400'. The ferrule 410 and the complementary ferrule 410' may be disposed within a ferrule sleeve 485 after alignment between the array of lenses 422 and the complementary array of lenses 422'.

During operation, light 440A from source optical fibers 460 travels through the lens substrate 420 and is collimated by the lenses 422 to form dust-tolerant expanded (collimated) beams 440B, which propagate in free space (or, in some embodiments, epoxy or another optical material) and across an alignment plane 429 and into the complementary array of lenses 422'. The complementary array of lenses 422' focuses the beams 440C into the complementary array of optical fibers 460'.

Figure 12B:
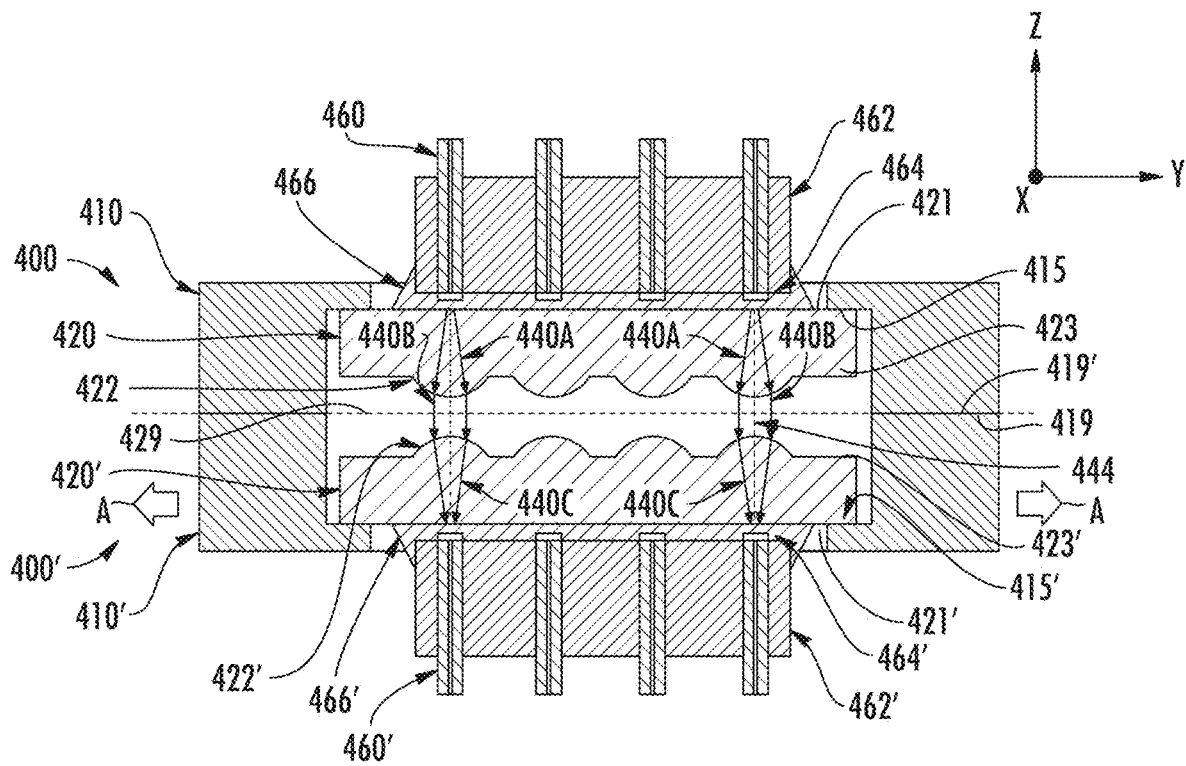
FIG. 12B schematically depicts a cross section view of an example method of determining insertion loss for example lensed connector ferrule assemblies according to one or more embodiments described and illustrated herein.
Figure 12C:
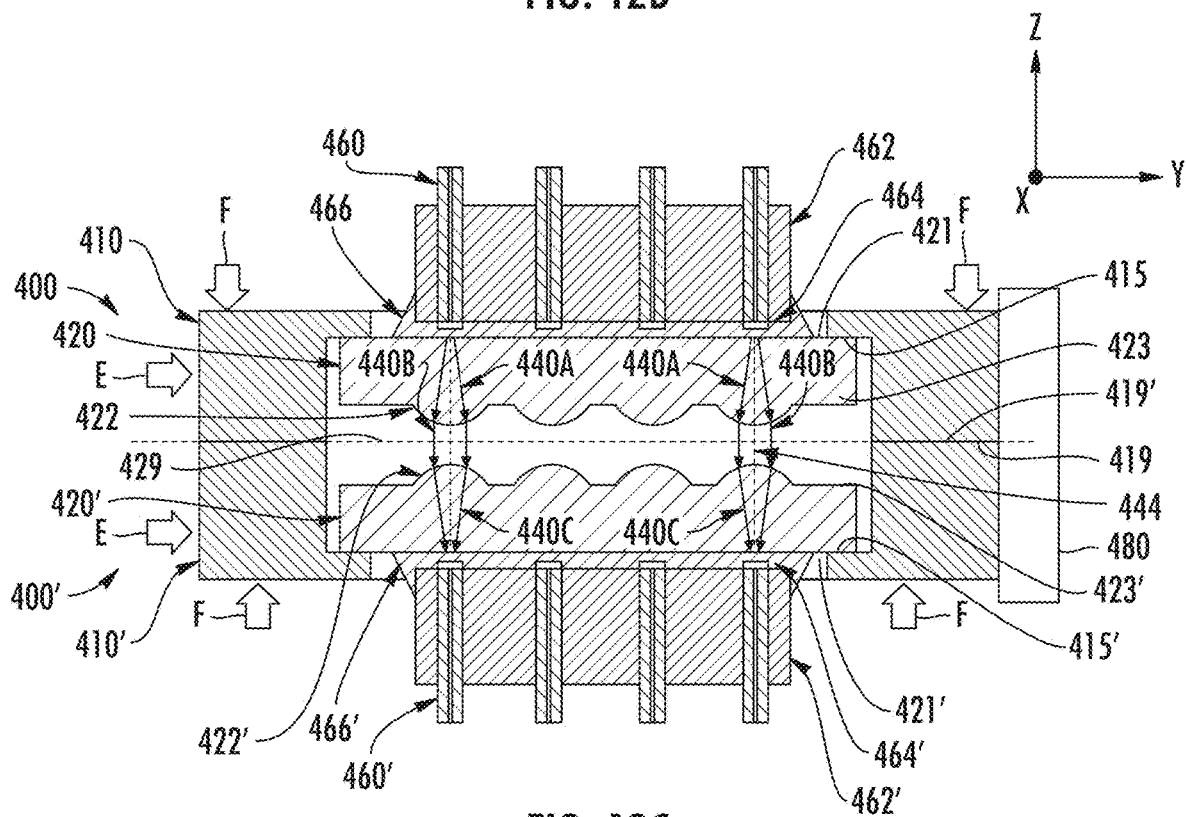
FIG. 12C schematically depicts a cross section view of another example method determining of insertion loss for example lensed connector ferrule assemblies according to one or more embodiments described and illustrated herein.

Lensed connector ferrule insertion loss can also be characterized by mating a device-under-test (DUT) ferrule 410 with a reference or golden connector ferrule 410' as shown in FIG. 12B. In one approach, the two ferrules 410, 410' are placed in contact with each other and then one ferrule is laterally displaced in the x-y plane (as indicated by arrows A) and rotated about the z-axis until transmitted power through the two outboard fibers is maximized. This configuration provides a best case upper bound on power coupled through the DUT ferrule 410.

In an alternative approach as shown in FIG. 12C, the DUT ferrule 410 is laterally aligned to a reference ferrule 410' by providing a lateral force E to both ferrules that drives them into a common reference surface 480. Simultaneously, an axial compression force F is applied to both ferrules to bring their angular alignment surfaces into firm contact. Measurement of transmitted power through the outboard fibers in this configuration provides a more accurate estimate of the expected IL for the DUT ferrule 410 mated to another ferrule in joined connectors.

Figure 13A:
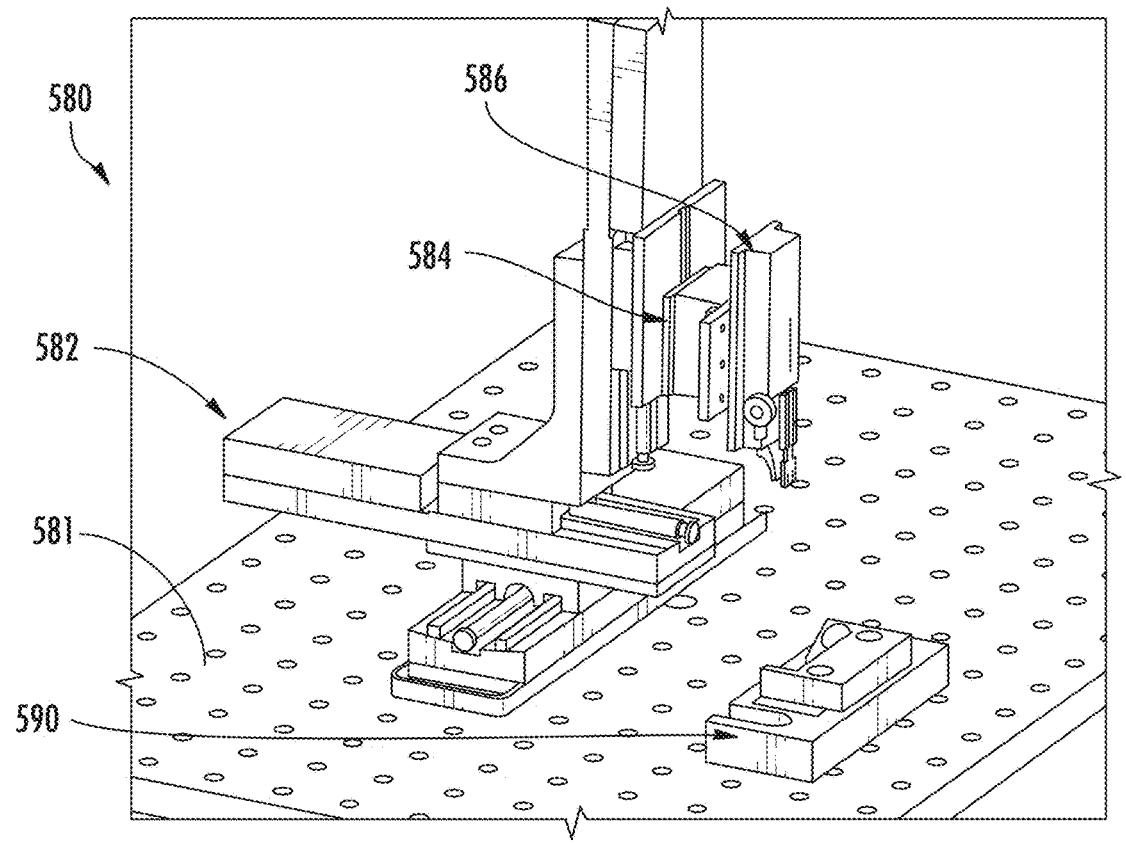
FIG. 13A schematically depicts a perspective view of an example assembly bench for assembling a lensed connector ferrule assembly according to one or more embodiments described and illustrated herein.

Referring now to FIG. 13A, an example assembly bench 580 for aligning and attaching an optical fiber to a lens substrate of a lensed connector ferrule is schematically illustrated. The assembly bench 580 is used to align and attach an optical fiber in a fiber holder (a glass V-groove block) to a glass lens substrate held in a lens substrate holder assembly 590.

Figure 13B:
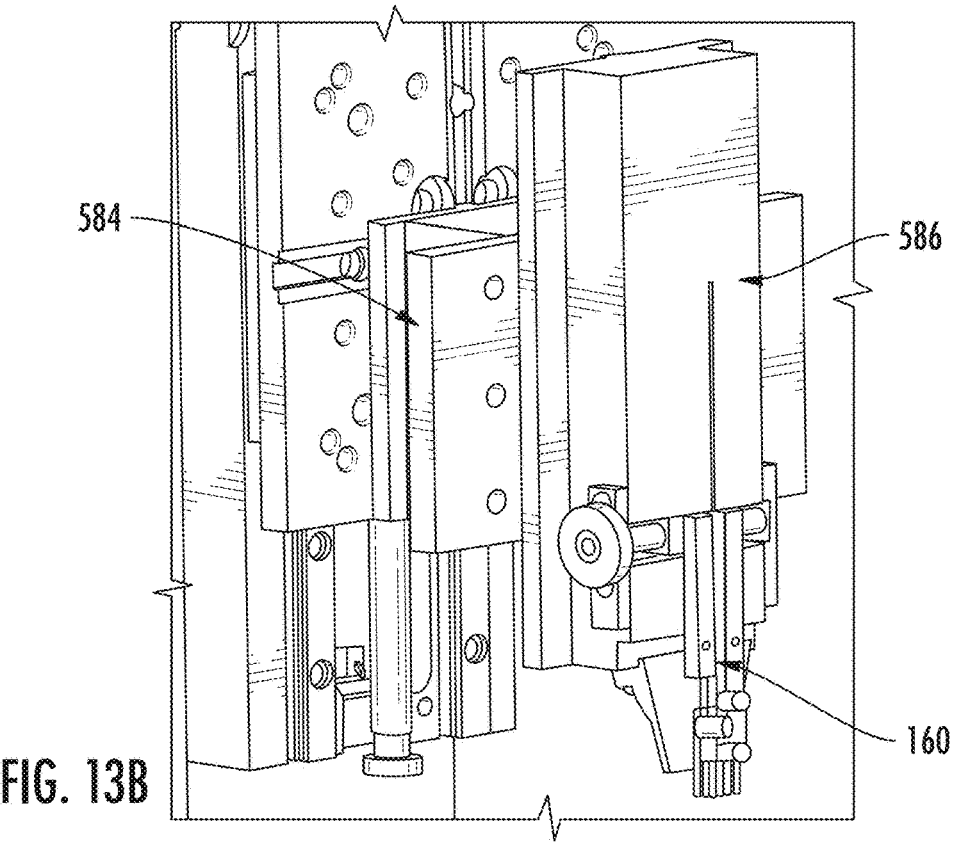
FIG. 13B schematically depicts a close-up perspective view of a V-groove holder of the example assembly bench depicted by FIG. 13A according to one or more embodiments described and illustrated herein.

The optical fiber 160 and fiber holder is held in a V-groove holder 586 that squeezes the glass V-groove block fiber holder from two sides. FIG. 13B is a close-up view of the V-groove holder 586. The V-groove holder 586 is mounted on a force sensor 584 (e.g., 0-30 N) so that when the optical fiber 160 and the fiber holder 162 (not shown) are lowered toward the glass lens substrate (not shown) the exact point of contact can be detected. The V-groove holder 586 and force sensor 584 are mounted on an XYZ stage 582 so that the optical fiber 160 can be lowered onto the lens substrate (Z axis) and power peaked during lens alignment (X- and Y-axes).

Figure 14A:
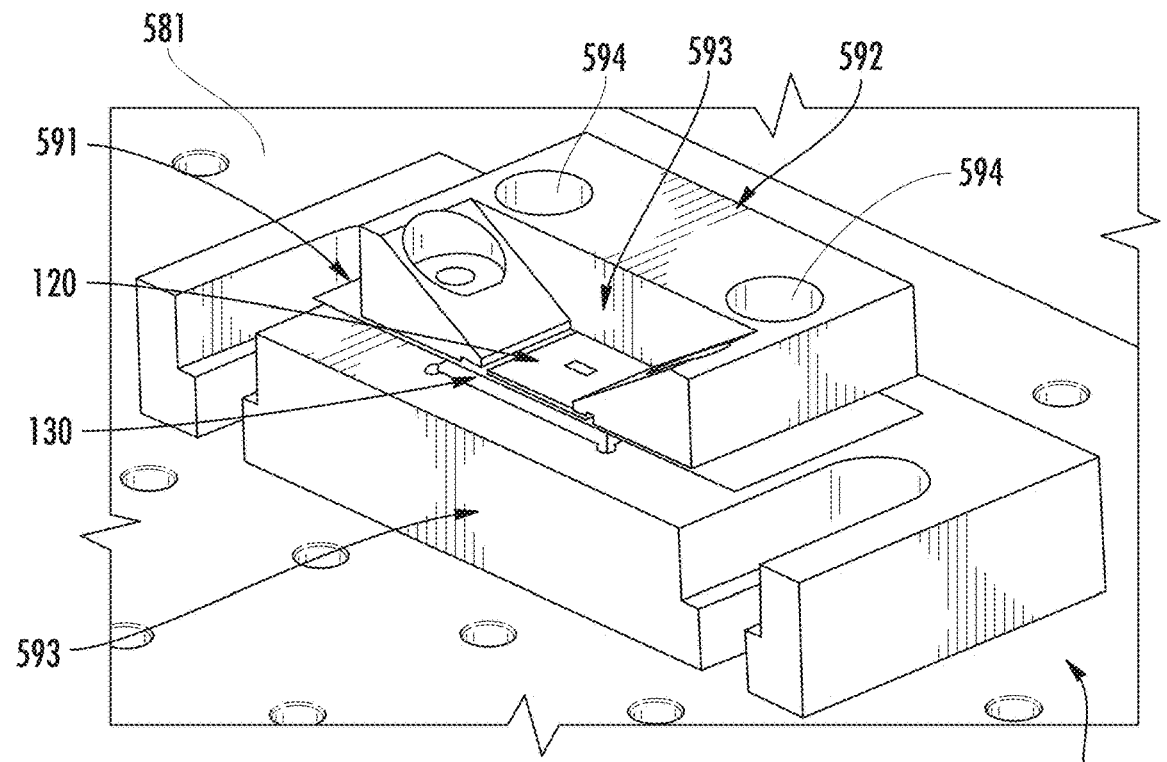
FIG. 14A schematically depicts a close-up perspective view of a lens substrate holder assembly of the example assembly bench depicted by FIG. 13A according to one or more embodiments described and illustrated herein.
Figure 14B:
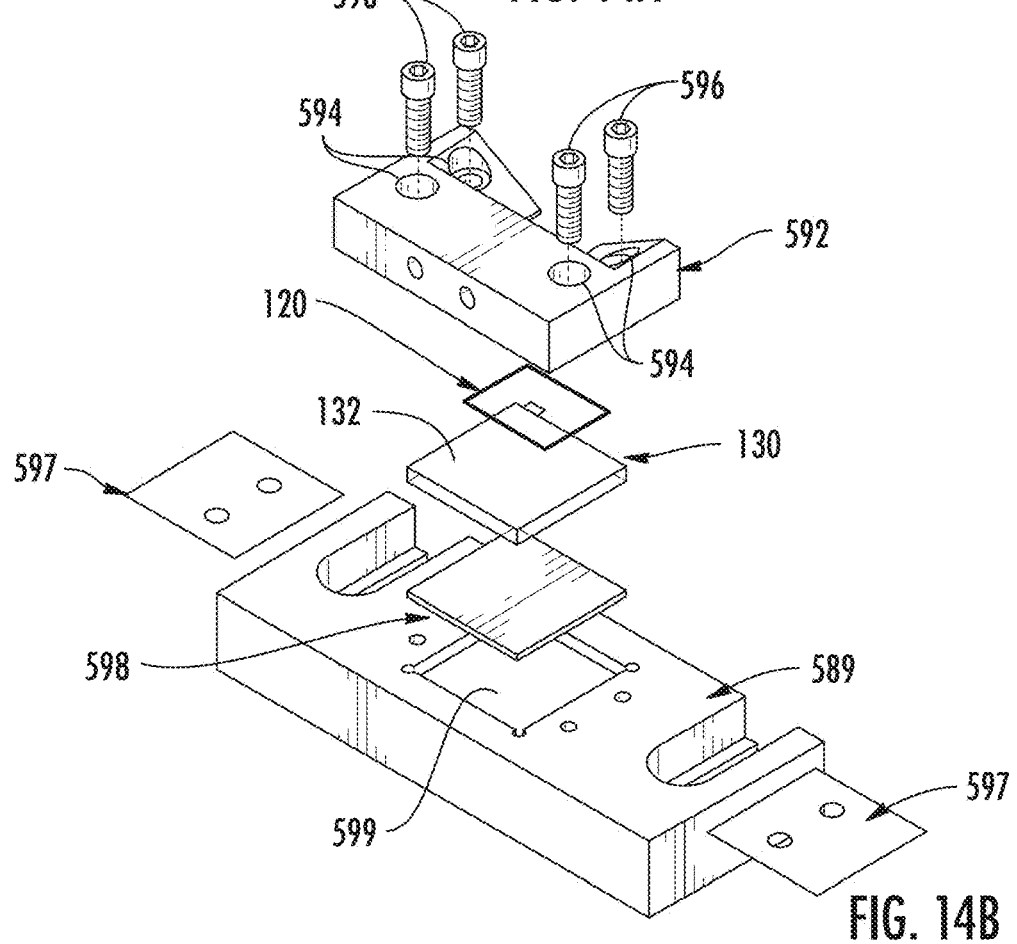
FIG. 14B schematically depicts an exploded view of the lens substrate holder assembly depicted by FIG. 14A according to one or more embodiments described and illustrated herein.

FIG. 14A provides a detailed view of the lens substrate holder assembly 590. FIG. 14B is an exploded view of the lens substrate holder assembly 590. The top side lens holder 592 has a U-shaped opening 593 that receives the lens array substrate. Two shims 597 are positioned between the lens substrate 120 and a mirror substrate 130 so that the lenses are not damaged during assembly and to provide a fixed offset between the lens substrate 120 and the mirror surface 132. The mirror substrate 130 rests on a rubber pad 598 that allows the mirror substrate 130 to flex, and both the mirror substrate 130 and rubber pad 598 are aligned in a machined pocket 599 on a mirror backer 589. Outboard screws 596 are used to hold the assembly together via threaded bores 594 so that the mirror substrate 130 and lens substrate 120 are immobilized.

EXAMPLE

An example assembly process using the assembly bench depicted in FIGS. 13A, 13B, 14A and 14B to attach an optical fiber to a lens substrate such that it is aligned to a single lens of the lens substrate will now be described. The process is initiated by loading an optical fiber, a fiber holder (a glass V-groove block holder) into the V-groove holder of the assembly bench. A rubber pad, mirror substrate, metal shims and lens substrate are loaded into the lens substrate holder as described above.

The fiber holder is coarsely aligned to the lens substrate in the XY axis. The fiber holder is then lowered downward (−Z axis) using the XYZ stage until it comes into contact with the lens substrate. Contact between the fiber holder and the lens substrate is determined by the force sensor. The fiber holder is then raised away from the lens substrate (+Z axis) until the force sensor feedback reading is minimized (e.g., zero or near zero force). The fiber holder is then backed further away from the lens substrate by an additional 50 μm.

Figure 15:
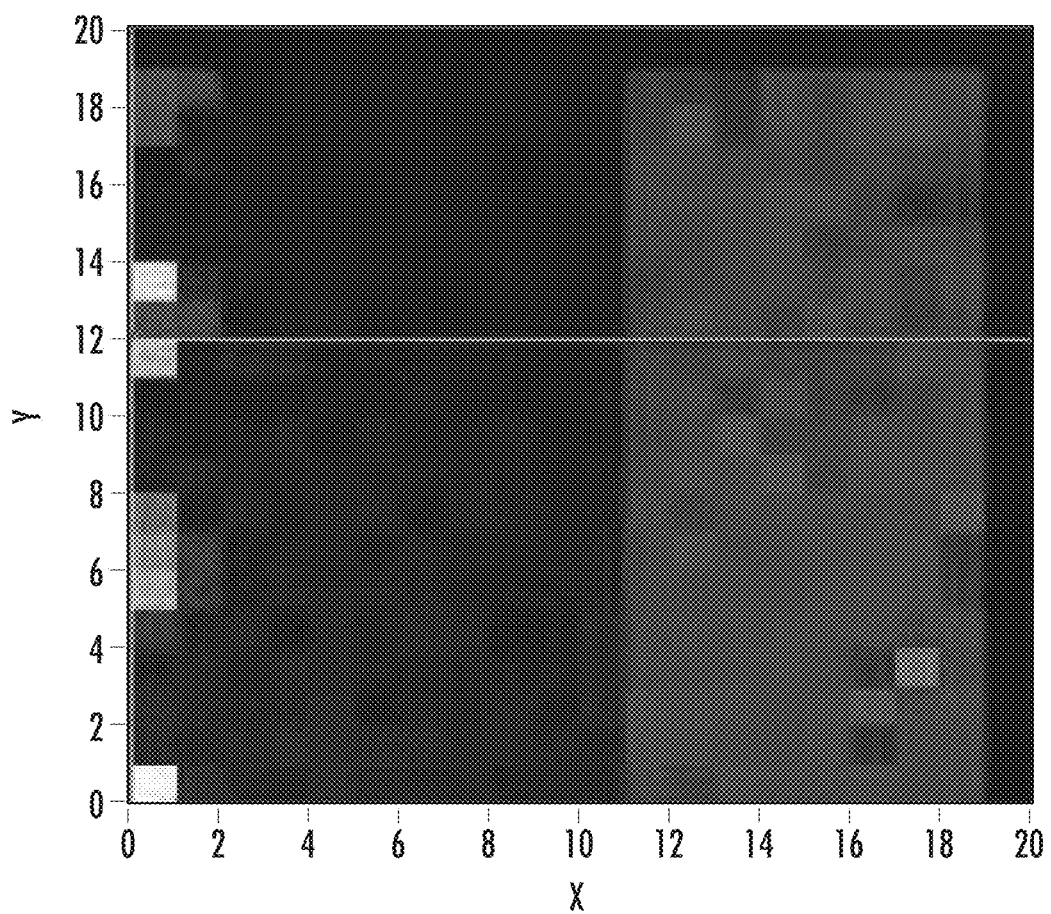
FIG. 15 is a graph depicting an example coarse scan of an array of lenses of a lens substrate according to one or more embodiments described and illustrated herein.

Next, a 30 μm resolution grid (20×20 points, 600×600 μm) in the XY plane is scanned using a light source and a photodetector as described above. FIG. 15 shows a coarse scan where lenses are visible along the left edge. Multiple scans can be performed over a larger area to form a clearer picture of the lens array of the lens substrate as shown in FIG. 16, which shows a map of reflected power versus fiber position where each power peak (concentric circles) is a lens.

Figure 16:
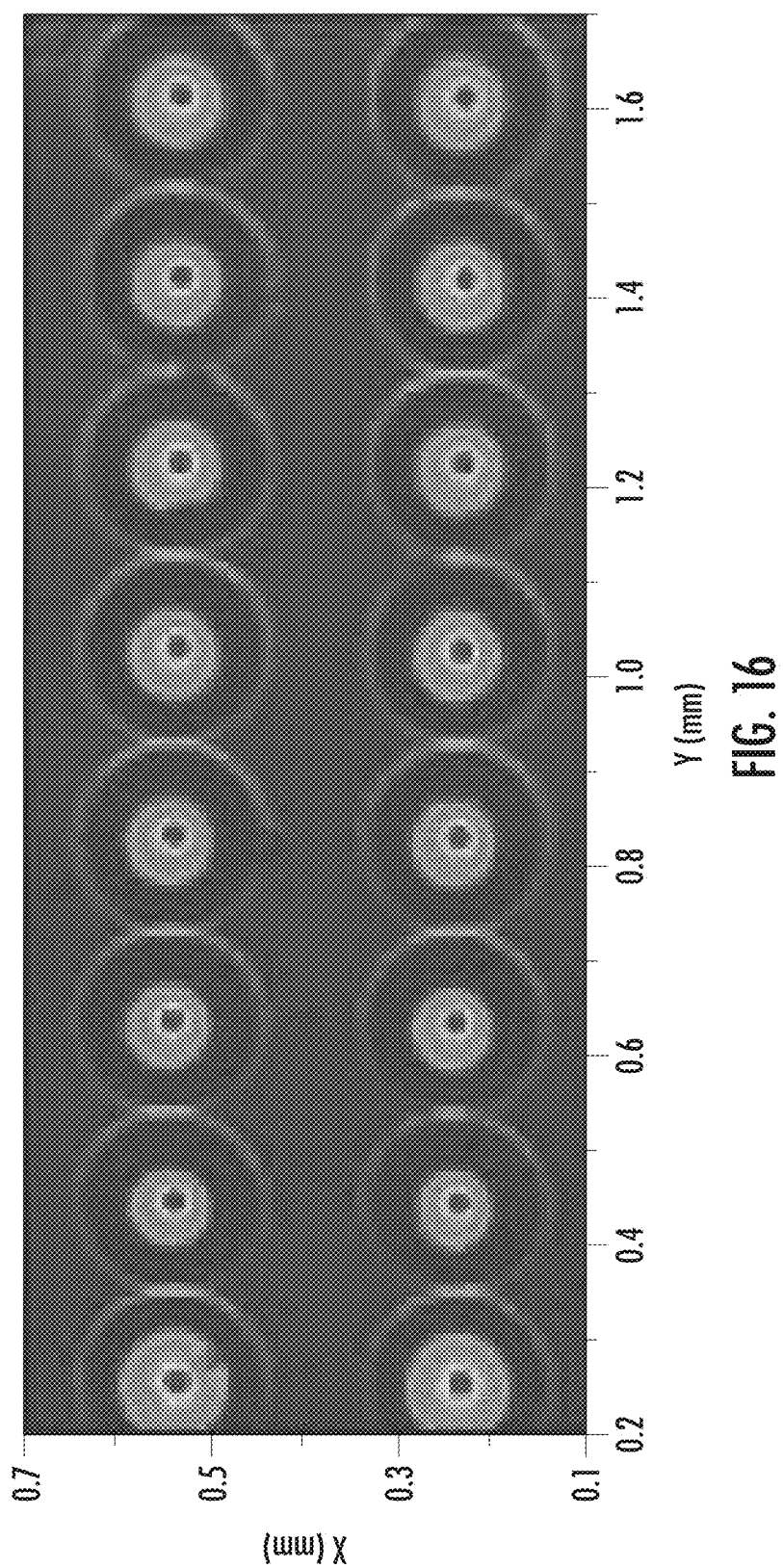
FIG. 16 is a graph depicting a map of reflected power versus fiber position, where each power peak is a lens according to one or more embodiments described and illustrated herein.
Figure 17:
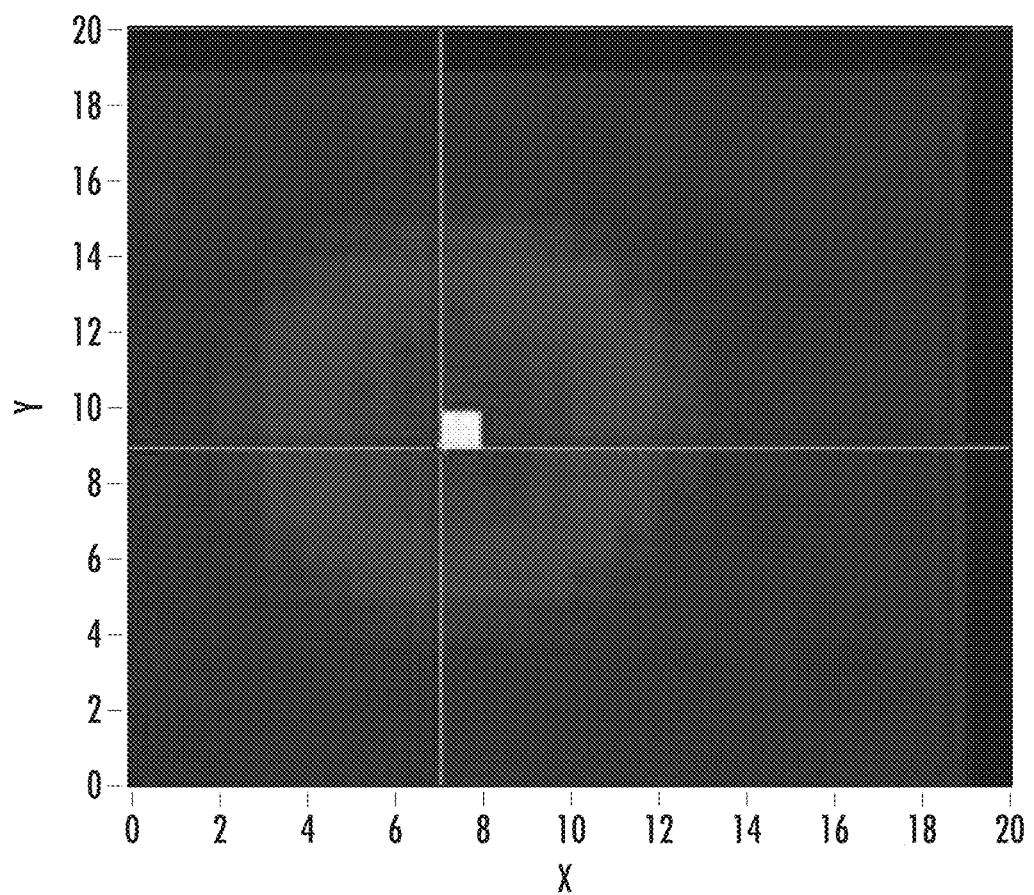
FIG. 17 is a graph depicting example scan results of scan over 10 µm resolution grid (20×20 points, 200×200 µm) in the XY plane over a selected lens according to one or more embodiments described and illustrated herein.
Figure 18:
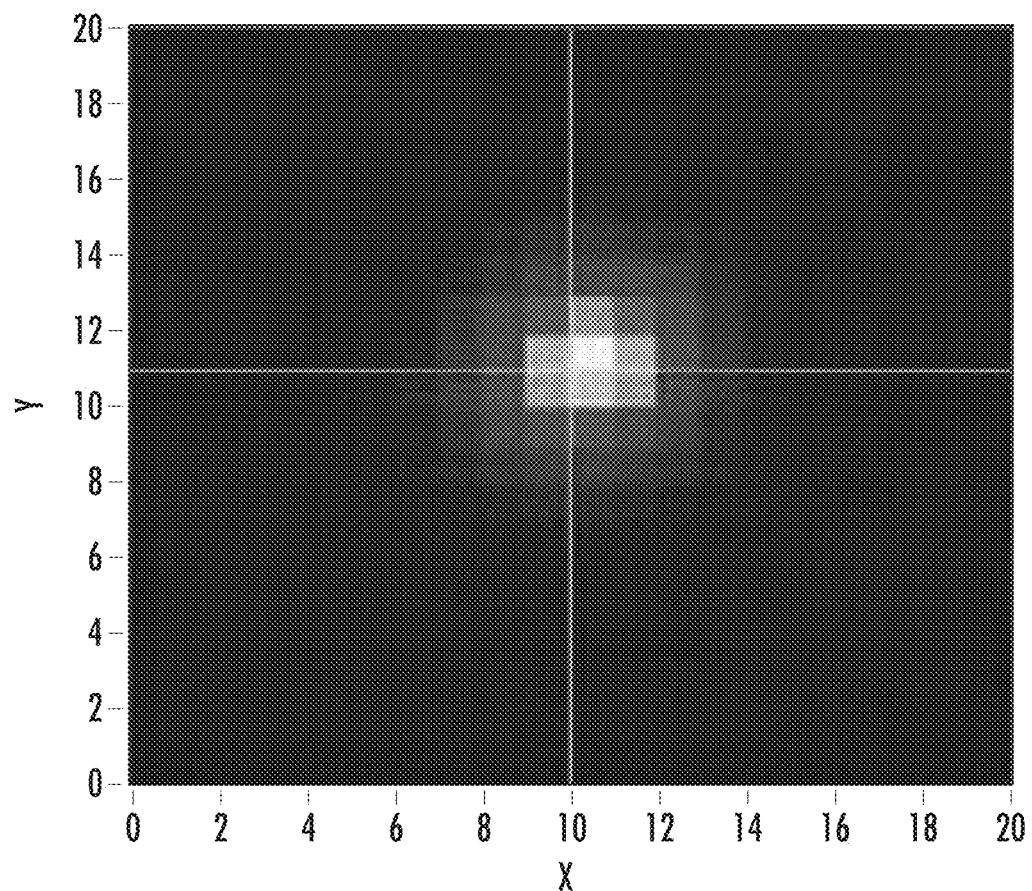
FIG. 18 is a graph depicting example results of scan over 1 µm resolution grid (20×20 points, 1 µm) centered over a selected lens according to one or more embodiments described and illustrated herein.
Figures 19A, 19B, 19C:
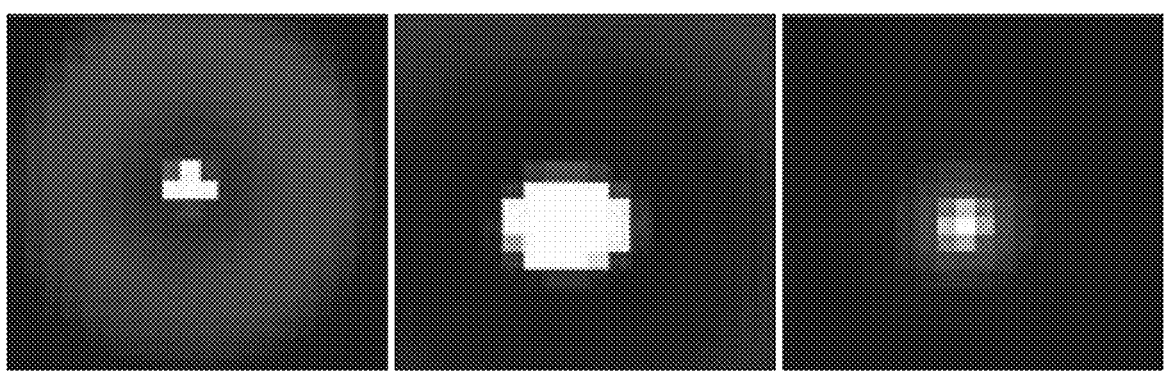
FIGS. 19A-19C depicts graphs illustrating a progression of scans from coarse resolution to fine resolution according to one or more embodiments described and illustrated herein.

The fiber holder is then moved to a first lens in the lens array referencing the reflected power map (e.g., as shown in FIG. 16). A 10 μm resolution grid (20×20 points, 200×200 is scanned μm) in the XY plane proximate the first lens. An example scan result is depicted in FIG. 17. The fiber holder is re-centered in the XY plane on the selected lens. Next a 1 μm resolution grid (20×20 points, 1 μm) is scanned. An example scan is shown in FIG. 18. FIGS. 19A-19C show a progression of scans from coarse (FIG. 19A) to fine (FIG. 19C) showing the ability to precisely locate the center of a lens using back-reflected optical power.

Figure 20:
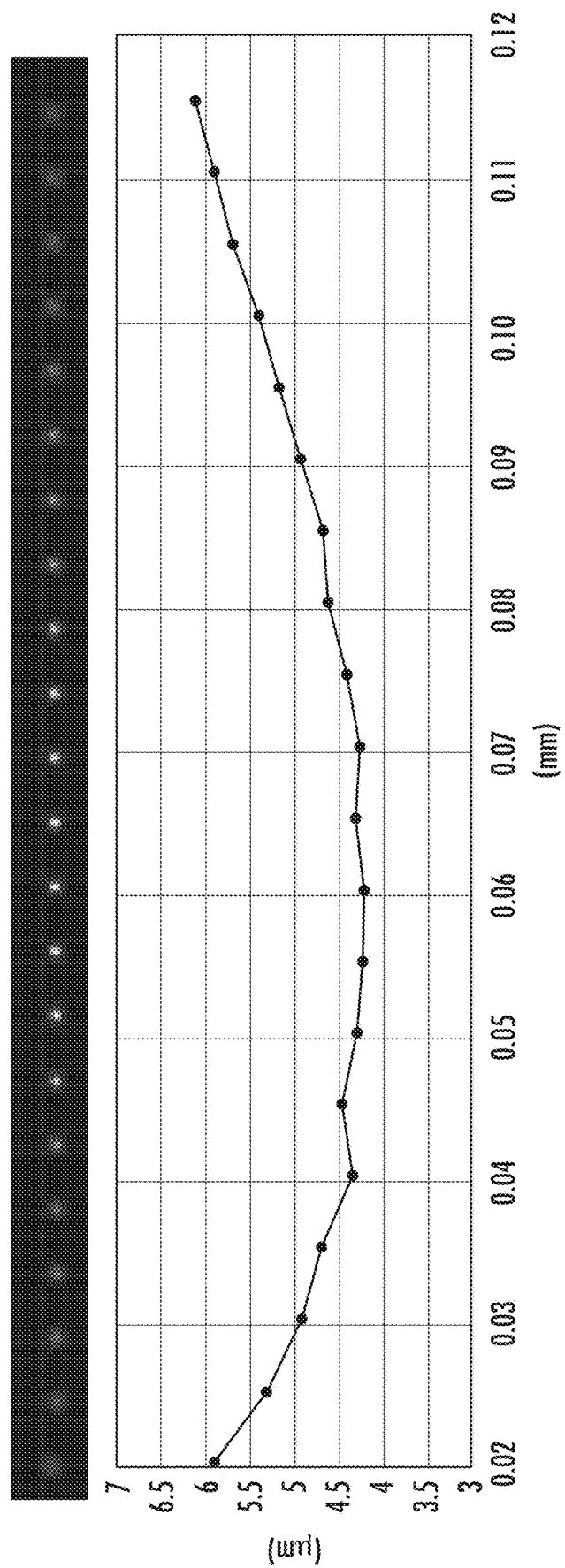
FIG. 20 depicts a graph plotting convoluted radius of a beam versus a distance of the optical fiber to the lens according to one or more embodiments described and illustrated herein.

Next, the focal point of the selected lens is determined by performing multiple 1 μm resolution grid scans by moving the fiber holder 10 μm along the optical axis (the Z-axis) at five positions. The focal point is verified in air using the convolved beam radius and adjusting the ferrule distance to the lens if needed. The beam radius is calculated by determining the lateral distance away from the peak power location required to receive 40% of the peak power. A Gaussian fit is made to this threshold data, and the $1/e^2$ power beam diameter is used to calculate the beam radius. FIG. 20 shows a series of XY axis power scans performed at a plurality of axial positions on the optical axis (Z-axis) away from the upper surface of the lens array substrate. The Y-axis is the convoluted radius in and the X-axis is the fiber to lens distance in mm. Particularly, FIG. 20 is an example showing how XY axis alignment scans performed over various fiber-to-lens axial distances (Z-axis) results in a range of convolved beam radii. The lens focal point can be determined by locating the minimum of the convolved radius curve.

Figure 21:
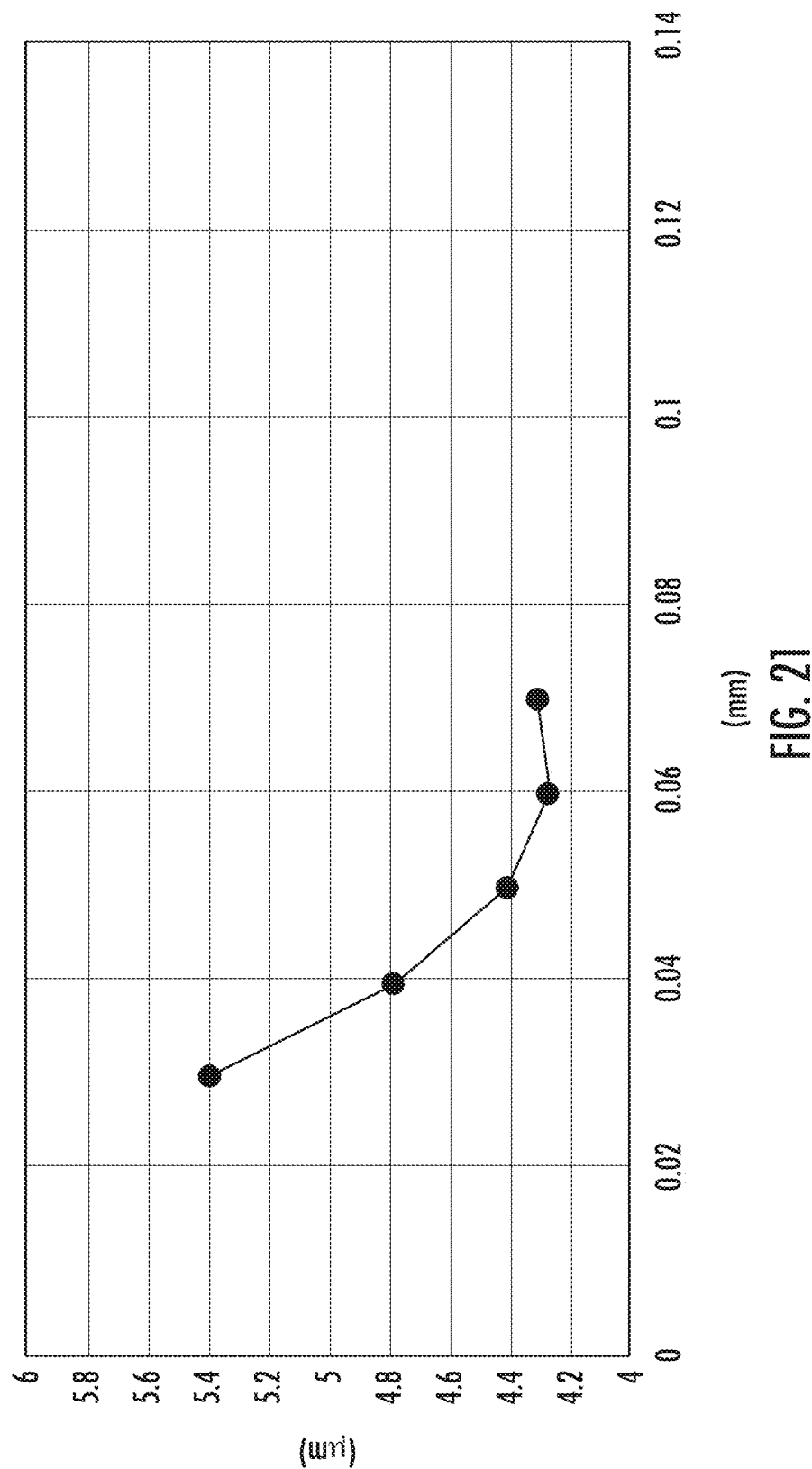
FIG. 21 depicts a graph plotting convoluted radius of a beam versus a distance of the optical fiber to the lens in air according to one or more embodiments described and illustrated herein.

FIG. 21 shows an example plot made using this technique in air (e.g., no adhesive applied at the fiber holder/lens array substrate interface). The Y-axis is the convoluted radius in μm, and the X-axis is the fiber to lens distance in mm.

Figure 22:
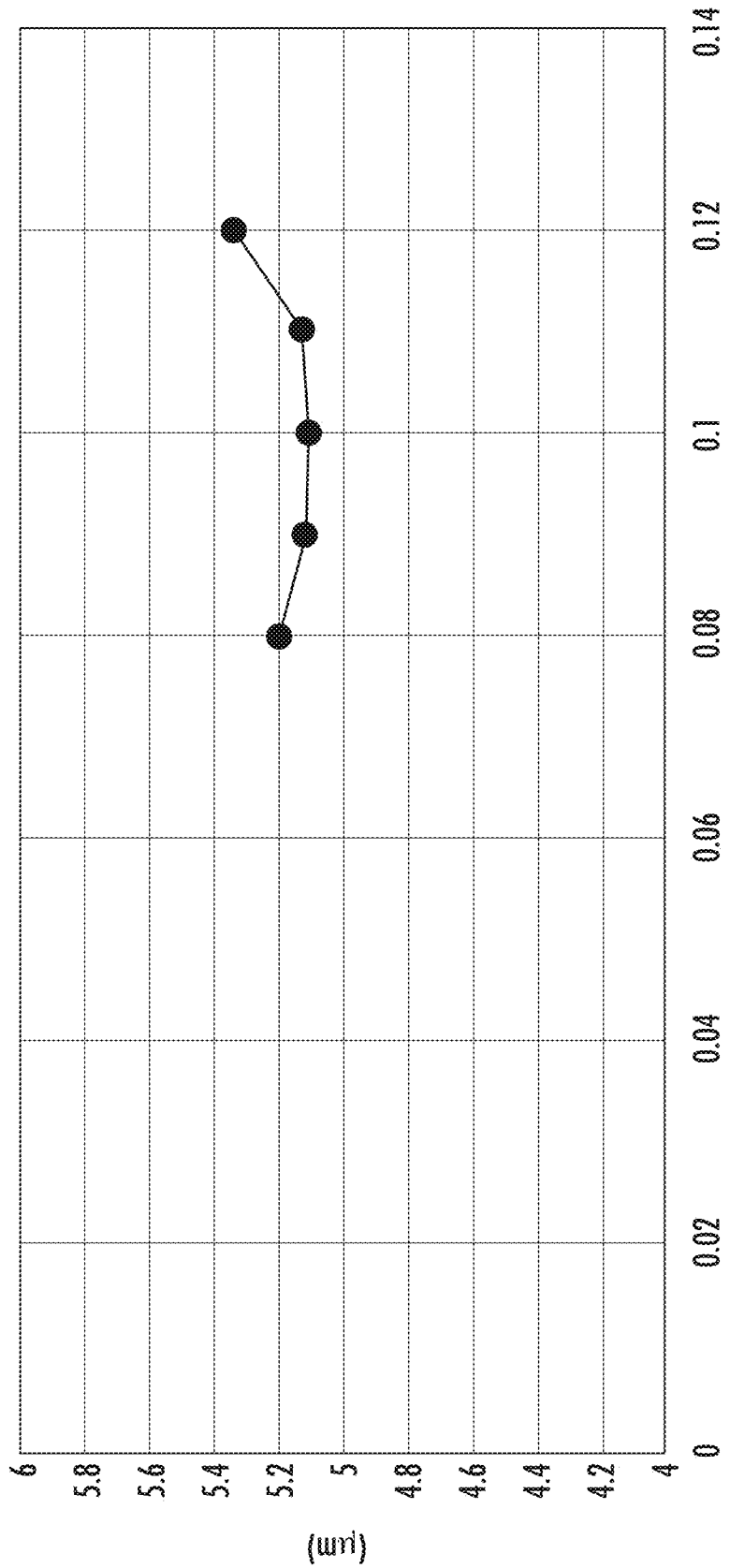
FIG. 22 depicts a graph plotting convoluted radius of a beam versus a distance of the optical fiber to the lens in epoxy according to one or more embodiments described and illustrated herein.

Then, the fiber holder is moved 1 mm further from the lens (+Z-axis) and epoxy is applied. Epoxy is applied by allowing the adhesive to wick from a syringe to the front face of the ferrule. The fiber holder is then moved 40 μm beyond (+Z-axis) the focal point measured in air. 1 μm resolution grid scans are made at five positions, moving 10 μm along the optical axis. The focal point of the lens in epoxy is verified using the convolved beam radius and adjust the ferrule distance to lens if needed as shown in FIG. 22. Particularly, FIG. 22 graphically depicts an example measurement of beam radius as a function of optical axis (Z-axis) distance from lens array substrate in epoxy. The Y-axis is the convoluted radius in μm, and the X-axis is the fiber to lens distance in mm.

Next, the fiber holder is moved away from the lens substrate an additional amount behind the focal point to allow for epoxy contraction during the cure (determined by epoxy and amount of epoxy dispensed). A uniform UV cure is applied for two minutes to prevent the epoxy from pulling the fiber holder off center of the lens. Reflected power measurements are used to determine if the fiber holder is moving. The setup is allowed to sit for two hours, and then the fiber restrains are removed and the lens substrate holder is removed from the mirror backer.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A method of assembling a lens ferrule assembly, the method comprising:
   providing a connector ferrule assembly comprising:
      a ferrule comprising:
         a lens holder comprising a lens substrate cavity and an engagement surface; and
         a lens substrate disposed within the lens substrate cavity, the lens substrate comprising at least one lens at a lens surface and a fiber surface that is opposite the lens surface; and
      coupling a mirror surface to the engagement surface of the ferrule such that the at least one lens is offset from the mirror surface by an offset distance;
   coupling a first end face of at least one optical fiber to a circulator device, wherein an input of the circulator device is coupled to a light source and an output of the circulator device is coupled to a photodetector;
   positioning a second end face of at least one optical fiber at the fiber surface of the lens substrate;
   injecting a light beam into the circulator device such that the light beam enters the at least one optical fiber, wherein the light beam is received by the at least one lens, reflected by the mirror surface, received by the at least one lens, provided to the at least one optical fiber, and at least a portion of the light beam is provided to the photodetector by the circulator device;
   shifting a position of the second end face of the at least one optical fiber with respect to the fiber surface in at least one direction while measuring an optical power received by the photodetector;
   positioning the second end face of the at least one optical fiber at a location on the fiber surface having a maximum optical power received by the photodetector;
   applying an adhesive to the second end face of the at least one optical fiber and the fiber surface; and
   curing the adhesive with the second end face of the at least one optical fiber at the location on the fiber surface having the maximum optical power.

2. The method of claim 1, wherein the at least one direction is one or more of a lateral direction along the fiber surface, an angular direction of the at least one optical fiber, and an axial direction toward or away from the fiber surface.

3. The method of claim 1, wherein continuously shifting the position of the second end face of the at least one optical fiber comprises translating the at least one optical fiber with respect to the lens substrate.

4. The method of claim 1, wherein continuously shifting the position of the second end face of the at least one optical fiber comprises translating the lens holder and the lens substrate with respect to the second end face of the at least one optical fiber.

5. The method of claim 1, wherein the at least one direction is a lateral direction along the fiber surface and the method further comprises determining a lateral position having a maximum optical power received by the photodetector.

6. The method of claim 5, wherein the at least one direction further comprises an axial direction, and the method further comprises:
   determining a focal point of the at least one lens at the lateral position by measuring the optical power using the photodetector at a plurality of axial positions of the second end face of the at least one optical fiber;
   positioning the second end face of the at least one optical fiber at a first axial distance away from the focal point of the at least one lens in a positive direction away from the fiber surface of the lens substrate;
   applying an adhesive to the second end face of the at least one optical fiber and the fiber surface of the lens substrate;
   positioning the second end face of the at least one optical fiber at a second axial distance away from the focal point of the at least one lens in the positive direction away from the fiber surface of the lens substrate, wherein the second axial distance is closer to the fiber surface than the first axial distance;
   determining the focal point of the at least one lens within the adhesive by measuring the optical power using the photodetector at a plurality of axial positions of the second end face of the at least one optical fiber;
   positioning the second end face of the at least one optical fiber at a third axial distance away from the focal point of the at least one lens in the positive direction away from the fiber surface of the lens substrate, wherein the third axial distance accommodates contraction of the adhesive during curing of the adhesive.

7. The method of claim 1, wherein the mirror surface is parallel to the lens surface of the lens substrate.

8. The method of claim 1, further comprising determining a position of a fiber core of the at least one optical fiber by one or more cameras with a field of view through the mirror surface and the lens substrate.

9. The method of claim 1, wherein curing the adhesive comprises applying ultraviolet light through the mirror surface and the lens substrate.

10. A lensed connector ferrule assembly comprising:
   a ferrule comprising:
      a lens holder comprising:
         a lens substrate cavity;
         a lens mounting surface within the lens substrate cavity; and
         an engagement surface;
      a lens substrate disposed within the lens substrate cavity, the lens substrate comprising:
         at least one lens at a lens surface; and
         a fiber surface opposite from the lens surface, wherein the lens substrate is coupled to the lens mounting surface, and the at least one lens is offset from the engagement surface by an offset distance;
a fiber holder; and
at least one optical fiber disposed within the fiber holder, wherein the fiber holder and an end face of the at least one optical fiber is coupled to the fiber surface of the lens substrate by an adhesive.

11. The lensed connector ferrule assembly of claim 10, wherein a lateral offset between the at least one optical fiber and the at least one lens is less than or equal to ±0.7 µm.

12. The lensed connector ferrule assembly of claim 10, wherein an axial misalignment between the end face of the at least one optical fiber and a focal point of the at least one lens is less than or equal to 12 µm.

13. The lensed connector ferrule assembly of claim 10, wherein:
the lens holder comprises an aperture pocket defined by one or more lens supports;
the one or more lens supports define the lens mounting surface; and
the at least one optical fiber is partially disposed within the aperture pocket.

14. The lensed connector ferrule assembly of claim 13, wherein the fiber surface of the lens substrate is coupled to the lens mounting surface.

15. The lensed connector ferrule assembly of claim 13, wherein the lens surface of the lens substrate is coupled to the lens mounting surface.

16. The lensed connector ferrule assembly of claim 10, wherein the lens substrate is coupled to the lens holder within the lens substrate cavity by an adhesive.

17. The lensed connector ferrule assembly of claim 10, wherein the at least one lens is configured to collimate an optical signal from the at least one optical fiber.

18. The lensed connector ferrule assembly of claim 10, wherein the at least one lens is fabricate from a material of the lens substrate.

19. The lensed connector ferrule assembly of claim 18, wherein the at least one lens is a convex lens at the lens surface of the lens substrate.

20. The lensed connector ferrule assembly of claim 10, wherein the at least one optical fiber is optically coupled to the at least one lens.

21. The lensed connector ferrule assembly of claim 10, wherein:
the at least one lens comprises a plurality of lenses; and
the at least one optical fiber comprises a plurality of optical fibers.

22. The lensed connector ferrule assembly of claim 10, wherein the lens surface is parallel to the engagement surface.

23. The lensed connector ferrule assembly of claim 10, further comprising:
a complementary ferrule comprising:
a complementary lens holder comprising:
a complementary lens substrate cavity;
a complementary lens mounting surface within the complementary lens substrate cavity; and
a complementary engagement surface, wherein the complementary engagement surface is coupled to the complementary engagement surface of the complementary lens holder;
a complementary lens substrate disposed within the complementary lens substrate cavity, the complementary lens substrate comprising:
at least one complementary lens at a complementary lens surface; and
a complementary fiber surface opposite from the complementary lens surface, wherein the complementary lens substrate is coupled to the complementary lens mounting surface, and the at least one complementary lens is offset from the complementary engagement surface by an offset distance;
a complementary fiber holder; and
at least one complementary optical fiber disposed within the fiber holder, wherein the complementary fiber holder and the end face of the at least one complementary optical fiber is coupled to the complementary fiber surface of the complementary lens substrate by an adhesive.

24. The lensed connector ferrule assembly of claim 23, wherein the at least one lens is optically coupled to the at least one complementary lens.

25. The lensed connector ferrule assembly of claim 23, wherein the at least one lens and the at least one complementary lens are configured such that a collimated beam is present therebetween when a beam is propagated from the at least one optical fiber or the at least one complementary optical fiber.

26. The lensed connector ferrule assembly of claim 23, wherein the ferrule and the complementary ferrule are disposed within a ferrule sleeve.

27. The lensed connector ferrule assembly of claim 23, wherein a lateral offset between the at least one lens and the at least one complementary lens is less than or equal to ±0.5 µm.

28. The lensed connector ferrule assembly of claim 23, wherein an angular offset between the at least one lens and the at least one complementary lens is less than or equal to ±0.1 degrees.

29. An optical assembly comprising:
a ferrule comprising:
a lens holder comprising a lens substrate cavity and an engagement surface; and
a lens substrate disposed within the lens substrate cavity, the lens substrate comprising at least one lens;
at least one optical fiber, wherein:
an end face of the at least one optical fiber is coupled to a fiber surface of the lens substrate;
the at least one lens is at a lens surface of the lens substrate; and
the fiber surface is opposite the lens surface; and
a mirror surface coupled to the engagement surface such that the at least one lens is offset from the mirror surface by an offset distance.

30. The optical assembly of claim 29, further comprising a mirror substrate, wherein the mirror surface is a surface of the mirror substrate.

31. The optical assembly of claim 30, wherein:
the lens substrate comprises a lens surface;
the at least one lens is at the lens surface; and
the lens surface is parallel to the engagement surface.

32. The optical assembly of claim 29, wherein the end face of the at least one optical fiber is coupled to the fiber surface of the lens substrate by an ultraviolet light curable adhesive.

33. The optical assembly of claim 29, wherein the end face of the at least one optical fiber is coated with an anti-reflective coating.

34. The optical assembly of claim 29, further comprising a fiber holder, wherein the at least one optical fiber is disposed within the fiber holder.

35. The optical assembly of claim 34, wherein:
the at least one lens comprises a plurality of lenses; and the at least one optical fiber comprises a plurality of optical fibers disposed within the fiber holder.

36. The optical assembly of claim 29, wherein the at least one optical fiber is optically coupled to the at least one lens.

37. The optical assembly of claim 29, wherein:
the lens holder comprises an aperture pocket defined by one or more lens supports;
the one or more lens supports define a lens mounting surface; and
the lens substrate comprises a fiber surface.

38. The optical assembly of claim 37, wherein the fiber surface of the lens substrate is coupled to the lens mounting surface.

39. The optical assembly of claim 37, wherein:
the lens substrate comprises a lens surface; and
the lens surface of the lens substrate is coupled to the lens mounting surface.

40. The optical assembly of claim 37, further comprising at least one optical fiber positioned within the aperture pocket.

41. The optical assembly of claim 29, wherein the lens substrate is coupled to the lens holder within the lens substrate cavity by an adhesive.

42. The optical assembly of claim 29, wherein the at least one lens is configured to collimate an optical signal.

43. The optical assembly of claim 29, wherein the at least one lens is fabricate from a material of the lens substrate.

44. The optical assembly of claim 43, wherein the at least one lens is a convex lens at a lens surface of the lens substrate.

* * * * *